US009201147B2

(12) United States Patent
Chen et al.

(10) Patent No.: US 9,201,147 B2
(45) Date of Patent: Dec. 1, 2015

(54) GNSS SIGNAL PROCESSING WITH REGIONAL AUGMENTATION NETWORK

(75) Inventors: Xiaoming Chen, Hoehenkirchen (DE); Ulrich Vollath, Superior, CO (US); Kendall Ferguson, Stafford, VA (US)

(73) Assignee: Trimble Navigation Limited, Sunnyvale, CA (US)

( * ) Notice: Subject to any disclaimer, the term of this patent is extended or adjusted under 35 U.S.C. 154(b) by 694 days.

(21) Appl. No.: 13/522,323

(22) PCT Filed: Feb. 14, 2011

(86) PCT No.: PCT/US2011/024733
§ 371 (c)(1),
(2), (4) Date: Jul. 14, 2012

(87) PCT Pub. No.: WO2011/126605
PCT Pub. Date: Oct. 13, 2011

(65) Prior Publication Data
US 2012/0293367 A1    Nov. 22, 2012

Related U.S. Application Data

(60) Provisional application No. 61/337,980, filed on Feb. 14, 2010, provisional application No. 61/396,676, filed on May 30, 2010.

(51) Int. Cl.
*G01S 19/41* (2010.01)
*G01S 19/04* (2010.01)
(Continued)

(52) U.S. Cl.
CPC ............... *G01S 19/04* (2013.01); *G01S 19/07* (2013.01); *G01S 19/32* (2013.01); *G01S 19/44* (2013.01);
(Continued)

(58) Field of Classification Search
CPC ......... G01S 19/41; G01S 19/43; G01S 19/07; G01S 19/04; G01S 19/02; G01S 1/00; G01S 19/40; G01S 5/14; G01S 19/32; G01S 19/44
USPC .................................................... 342/357.24
See application file for complete search history.

(56) References Cited

U.S. PATENT DOCUMENTS

| 5,311,194 A | 5/1994 | Brown |
| 5,323,322 A | 6/1994 | Mueller et al. |

(Continued)

FOREIGN PATENT DOCUMENTS

| EP | 1 862 809 A1 | 12/2007 |
| EP | 2 037 291 A1 | 3/2009 |

(Continued)

OTHER PUBLICATIONS

International Search Report (Form PCT/ISA/210) and Written Opinion of the International Searching Authority (Form PCT/ISA/237) mailed May 31, 2011 in International Application No. PCT/US2010/002565 (six pages).

(Continued)

*Primary Examiner* — Frank J McGue
(74) *Attorney, Agent, or Firm* — Kilpatrick Townsend & Stockton LLP

(57) ABSTRACT

Methods and apparatus for processing of GNSS data derived from multi-frequency code and carrier observations are presented which make available correction data for use by a rover located within the region, the correction data comprising: the ionospheric delay over the region, the tropospheric delay over the region, the phase-leveled geometric correction per satellite, and the at least one code bias per satellite. In some embodiments the correction data includes an ionospheric phase bias per satellite. Methods and apparatus for determining a precise position of a rover located within a region are presented in which a GNSS receiver is operated to obtain multi-frequency code and carrier observations and correction data, to create rover corrections from the correction data, and to determine a precise rover position using the rover observations and the rover corrections. The correction data comprises at least one code bias per satellite, a fixed-nature MW bias per satellite and/or values from which a fixed-nature MW bias per satellite is derivable, and an ionospheric delay per satellite for each of multiple regional network stations and/or non-ionospheric corrections. Methods and apparatus for encoding and decoding the correction messages containing correction data are also presented, in which network messages include network elements related to substantially all stations of the network and cluster messages include cluster elements related to subsets of the network.

32 Claims, 22 Drawing Sheets

(51) Int. Cl.

| | | |
|---|---|---|
| *G01S 19/07* | (2010.01) | |
| *G01S 19/32* | (2010.01) | |
| *G01S 19/44* | (2010.01) | |
| G01S 19/02 | (2010.01) | |
| G01S 1/00 | (2006.01) | |
| G01S 19/40 | (2010.01) | |
| G01S 5/14 | (2006.01) | |
| G01S 19/43 | (2010.01) | |

(52) U.S. Cl.
CPC .... *G01S 1/00* (2013.01); *G01S 5/14* (2013.01);
*G01S 19/02* (2013.01); *G01S 19/40* (2013.01);
*G01S 19/41* (2013.01); *G01S 19/43* (2013.01)

(56) References Cited

U.S. PATENT DOCUMENTS

| | | | |
|---|---|---|---|
| 5,828,336 | A | 10/1998 | Yunck et al. |
| 5,893,044 | A | 4/1999 | King et al. |
| 6,295,021 | B1 | 9/2001 | Lichten et al. |
| 6,324,473 | B1 | 11/2001 | Eschenbach |
| 6,662,107 | B2 | 12/2003 | Gronemeyer |
| 7,117,417 | B2 | 10/2006 | Sharpe et al. |
| 7,292,185 | B2 | 11/2007 | Whitehead et al. |
| 7,312,747 | B2 | 12/2007 | Vollath et al. |
| 7,432,853 | B2 | 10/2008 | Vollath |
| 7,498,979 | B2 | 3/2009 | Liu et al. |
| 7,538,721 | B2 | 5/2009 | Vollath et al. |
| 7,541,975 | B2 | 6/2009 | Sever et al. |
| 7,576,690 | B2 | 8/2009 | Vollath |
| 7,580,794 | B2 | 8/2009 | Janky et al. |
| 7,589,668 | B2 | 9/2009 | Vollath et al. |
| 7,692,578 | B2 | 4/2010 | Vollath et al. |
| 7,746,272 | B2 | 6/2010 | Vollath |
| 7,755,542 | B2 | 7/2010 | Chen et al. |
| 7,768,449 | B2 | 8/2010 | Gaal et al. |
| 7,868,820 | B2 | 1/2011 | Kolb |
| 7,961,143 | B2 | 6/2011 | Dai et al. |
| 7,982,667 | B2 | 7/2011 | Vollath et al. |
| 8,018,377 | B2 | 9/2011 | Collins |
| 8,035,552 | B2 | 10/2011 | Dai et al. |
| 8,130,143 | B2 | 3/2012 | Liu et al. |
| 8,237,609 | B2 | 8/2012 | Talbot et al. |
| 8,242,953 | B2 | 8/2012 | Dai et al. |
| 8,260,551 | B2 | 9/2012 | Janky et al. |
| 8,334,807 | B2 | 12/2012 | Gaal et al. |
| 8,368,590 | B2 | 2/2013 | Vollath et al. |
| 8,368,591 | B2 | 2/2013 | Talbot et al. |
| 8,400,351 | B2 | 3/2013 | Talbot et al. |
| 8,542,146 | B2 | 9/2013 | Vollath |
| 8,558,736 | B2 | 10/2013 | Talbot et al. |
| 8,587,475 | B2 | 11/2013 | Leandro |
| 8,614,642 | B2 | 12/2013 | Talbot et al. |
| 8,694,250 | B2 | 4/2014 | Talbot et al. |
| 8,704,708 | B2 | 4/2014 | Vollath |
| 8,704,709 | B2 | 4/2014 | Vollath et al. |
| 2003/0016147 | A1 | 1/2003 | Evans |
| 2003/0048218 | A1 | 3/2003 | Milnes et al. |
| 2005/0055160 | A1 | 3/2005 | King |
| 2005/0064878 | A1 | 3/2005 | O'Meagher |
| 2005/0101248 | A1 | 5/2005 | Vollath |
| 2007/0063894 | A1 | 3/2007 | Yu |
| 2007/0200753 | A1 | 8/2007 | Fuchs et al. |
| 2008/0036654 | A1 | 2/2008 | Hansen et al. |
| 2008/0192242 | A1 | 8/2008 | Nichols |
| 2008/0204312 | A1 | 8/2008 | Euler |
| 2008/0238768 | A1 | 10/2008 | Nosworthy |
| 2008/0258966 | A1 | 10/2008 | Sugimoto et al. |
| 2009/0027264 | A1 | 1/2009 | Chen et al. |
| 2009/0098880 | A1 | 4/2009 | Lindquist |
| 2009/0109090 | A1 | 4/2009 | Vollath |
| 2009/0135057 | A1 | 5/2009 | Vollath et al. |
| 2009/0140914 | A1 | 6/2009 | Talbot et al. |
| 2009/0179792 | A1 | 7/2009 | Remondi |
| 2009/0179793 | A1 | 7/2009 | Remondi |
| 2009/0184869 | A1 | 7/2009 | Talbot et al. |
| 2009/0224969 | A1 | 9/2009 | Kolb |
| 2009/0237298 | A1 | 9/2009 | Vollath et al. |
| 2009/0322600 | A1 | 12/2009 | Whitehead et al. |
| 2010/0033370 | A1 | 2/2010 | Lopez et al. |
| 2010/0073229 | A1 | 3/2010 | Pattabiraman et al. |
| 2010/0141515 | A1 | 6/2010 | Doucet et al. |
| 2010/0156709 | A1 | 6/2010 | Zhang et al. |
| 2010/0177806 | A1 | 7/2010 | Normark et al. |
| 2010/0188285 | A1 | 7/2010 | Collins |
| 2010/0214162 | A1 | 8/2010 | Talbot et al. |
| 2010/0245168 | A1 | 9/2010 | Rollet et al. |
| 2010/0253575 | A1 | 10/2010 | Vollath |
| 2010/0309043 | A1 | 12/2010 | Guenther |
| 2011/0140958 | A1 | 6/2011 | Henkel et al. |
| 2011/0140959 | A1 | 6/2011 | Vollath |
| 2011/0148698 | A1 | 6/2011 | Vollath |
| 2011/0156949 | A1 | 6/2011 | Vollath et al. |
| 2011/0187590 | A1 | 8/2011 | Leandro |
| 2011/0267228 | A1 | 11/2011 | Talbot et al. |
| 2011/0279314 | A1 | 11/2011 | Talbot et al. |
| 2011/0285587 | A1 | 11/2011 | Vollath et al. |
| 2012/0026038 | A1 | 2/2012 | Vollath |
| 2012/0092213 | A1 | 4/2012 | Chen |
| 2012/0119944 | A1 | 5/2012 | Chen |
| 2012/0154210 | A1 | 6/2012 | Landau et al. |
| 2012/0154214 | A1 | 6/2012 | Leandro |
| 2012/0154215 | A1 | 6/2012 | Vollath et al. |
| 2012/0162007 | A1 | 6/2012 | Leandro et al. |
| 2012/0163419 | A1 | 6/2012 | Seeger |
| 2012/0229332 | A1 | 9/2012 | Vollath et al. |
| 2012/0286991 | A1 | 11/2012 | Chen et al. |
| 2012/0293367 | A1 | 11/2012 | Chen et al. |
| 2012/0306694 | A1 | 12/2012 | Chen et al. |
| 2013/0044026 | A1 | 2/2013 | Chen et al. |
| 2013/0335266 | A1 | 12/2013 | Vollath et al. |
| 2014/0002300 | A1 | 1/2014 | Leandro et al. |
| 2014/0015712 | A1 | 1/2014 | Leandro et al. |

FOREIGN PATENT DOCUMENTS

| | | | |
|---|---|---|---|
| EP | 2333581 A1 | * | 6/2011 |
| WO | 03/038464 A2 | | 5/2003 |
| WO | 2005/043186 A2 | | 5/2005 |
| WO | 2007/082038 A1 | | 7/2007 |
| WO | 2010/096159 A2 | | 8/2010 |

OTHER PUBLICATIONS

International Search Report (Form PCT/ISA/210) and Written Opinion of the International Searching Authority (Form PCT/ISA/237) mailed May 31, 2011 in International Application No. PCT/US2010/002564 (seven pages).

International Search Report (Form PCT/ISA/210) and Written Opinion of the International Searching Authority (Form PCT/ISA/237) mailed May 30, 2011 in International Application No. PCT/US2010/002563 (six pages).

International Search Report (Form PCT/ISA/210) and Written Opinion of the International Searching Authority (Form PCT/ISA/237) mailed May 26, 2011 in International Application No. PCT/US2010/002562 (six pages).

International Search Report (Form PCT/ISA/210) and Written Opinion of the International Searching Authority (Form PCT/ISA/237) mailed May 31, 2011 in International Application No. PCT/US2010/002581 (six pages).

International Search Report (Form PCT/ISA/210) and Written Opinion of the International Searching Authority (Form PCT/ISA/237) mailed Sep. 27, 2011 in International Application No. PCT/US2011/024733 (ten pages).

International Search Report (Form PCT/ISA/210) and Written Opinion of the International Searching Authority (Form PCT/ISA/237) mailed Oct. 6, 2011 in International Application No. PCT/US2011/024743 (ten pages).

International Search Report (Form PCT/ISA/210) and Written Opinion of the International Searching Authority (Form PCT/ISA/237) mailed Sep. 26, 2011 in International Application No. PCT/US2011/024763 (ten pages).

(56) References Cited

OTHER PUBLICATIONS

International Search Report (Form PCT/ISA/210) and Written Opinion of the International Searching Authority (Form PCT/ISA/237) mailed Oct. 12, 2012 in International Application No. PCT/US2012/029694 (fourteen pages).
International Search Report (Form PCT/ISA/210) and Written Opinion of the International Searching Authority (Form PCT/ISA/237) mailed Oct. 16, 2012 in International Application No. PCT/US2012/028670 (eight pages).
International Search Report (Form PCT/ISA/210) and Written Opinion of the International Searching Authority (Form PCT/ISA/237) mailed Sep. 5, 2012 in International Application No. PCT/US2012/028671 (eight pages).
S. Banville et al., "Satellite and Receiver Phase Bias Calibration for Undifferenced Ambiguity Resolution," Proceedings of the 2008 National Technical Meeting of The Institute of Navigation, San Diego, CA, Jan. 2008, pp. 711-719.
Y. Bar-Sever et al., "A new model for GPS yaw attitude," Journal of Geodesy, vol. 70, No. 11, Nov. 1996, pp. 714-723 (abstract only).
G. Bierman, Factorization Methods for Discrete Sequential Estimation, Academic Press, Inc., 1977, 129 pp.
S. Bisnath et al., "Precise Orbit Determination of Low Earth Orbiters with GPS Point Positioning," Proceedings of the 2001 National Technical Meeting of The Institute of Navigation, Long Beach, CA, Jan. 2001, pp. 725-733.
P. Collins, "Isolating and Estimating Undifferenced GPS Integer Ambiguities," Proceedings of the 2008 National Technical Meeting of The Institute of Navigation, San Diego, CA, Jan. 2008, pp. 720-732.
P. Collins et al., "Precise Point Positioning with Ambiguity Resolution using the Decoupled Clock Model," Proceedings of the 21st International Technical Meeting of the Satellite Division of The Institute of Navigation (ION GNSS 2008), Savannah, GA, Sep. 2008, pp. 1315-1322.
P. Collins et al., "Accessing and Processing Real-Time GPS Corrections for Precise Point Positioning . . . Some User Considerations," Proceedings of the 18th International Technical Meeting of the Satellite Division of The Institute of Navigation (ION GNSS 2005), Long Beach, CA, Sep. 2005, pp. 1483-1491.
Y. Gao et al., "A New Method for Carrier-Phase-Based Precise Point Positioning", Navigation, Journal of The Institute of Navigation, vol. 49, No. 2, Summer 2002, pp. 109-116.
"GNSS Solutions: Precise Point Positioning and Its Challenges, Aided-GNSS and Signal Tracking," InsideGNSS, Nov./Dec. 2006, pp. 16-21.
M. Gabor et al., "Satellite-Satellite Single-Difference Phase Bias Calibration as Applied to Ambiguity Resolution", Navigation, Journal of The Institute of Navigation, vol. 49, No. 4, Winter 2002-2003, pp. 223-247.
M. Ge et al., "Resolution of GPS carrier-phase ambiguities in Precise Point Positioning (PPP) with daily observations," Journal of Geodesy, Jul. 2008, vol. 82, Issue 7, pp. 389-399.
A. Hauschild et al., "Real-time Clock Estimation for Precise Orbit Determination of LEO-Satellites," Proceedings of the 21st International Technical Meeting of the Satellite Division of The Institute of Navigation (ION GNSS 2008), Savannah, GA, Sep. 2008, pp. 581-589.
P. Héroux et al., "GPS Precise Point Positioning Using IGS Orbit Products," Phys. Chem. Earth (A), vol. 26, No. 6-8. pp. 573-578, 2001.
P. Héroux et al., "GPS Precise Point Positioning with a Difference," presented at Geomeatics '95, Ottawa, Ontario, Canada, Jun. 13-15, 1995, 11 pp.
S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.
IERS Conventions (2003), International Earth Rotation and Reference Systems Service, IERS Technical Note No. 32, 127 pp.

"IGS Product Table—updated for 2009," from http://igsch.jpl.nasa.gov/components/prods.html on Aug. 19, 2009, three pages.
J. Kouba, "A simplified yaw-attitude model for eclipsing GPS satellites," GPS Solutions, Jan. 2009, vol. 13, Issue 1, pp. 1-12.
J. Kouba, "A guide to using International GPS Service (IGS) Products," International GPS Service, Feb. 2003, 31 pp.
J. Kouba et al., "Precise Point Positioning Using IGS Orbit and Clock Products," GPS Solutions, Oct. 2001, vol. 5, Issue 2, pp. 12-28.
D. Lapucha et al., "Comparison of the Two Alternate Methods of Wide Area Carrier Phase Positioning," Proceedings of the 17th International Technical Meeting of the Satellite Division of The Institute of Navigation (ION GNSS 2004), Long Beach, CA, Sep. 2004, pp. 1864-1871.
D. Laurichesse et al., "Real Time Zero-difference Ambiguities Fixing and Absolute RTK," Proceedings of the 2008 National Technical Meeting of The Institute of Navigation, San Diego, CA, Jan. 2008, pp. 747-755.
D. Laurichesse et al., "Integer Ambiguity Resolution on Undifferenced GPS Phase Measurements and its Application to PPP," Proceedings of the 20th International Technical Meeting of the Satellite Division of The Institute of Navigation (ION GNSS 2007), Fort Worth, TX, Sep. 2007, pp. 839-848.
R. Leandro et al., "Wide Area Based Precise Point Positioning," Proceedings of the 19th International Technical Meeting of the Satellite Division of The Institute of Navigation (ION GNSS 2006), Fort Worth, TX, Sep. 2006, pp. 2272-2278.
R. Leandro et al., "UNB Neutral Atmosphere Models: Development and Performance," Proceedings of the 2006 National Technical Meeting of The Institute of Navigation, Monterey, CA, Jan. 2006, pp. 564-573.
S. Lo et al., "GNSS Album: Images and Spectral Signature of the New GNSS Signals," InsideGNSS, May/Jun. 2006, pp. 46-56.
W. Melbourne, "The case for ranging in GPS based geodetic systems," Proceedings 1st International Symposium on Precise Positioning with the Global Positioning system, U.S. Departmenet of Commerce, Rockville, Maryland, Apr. 15-19, vol. 1, pp. 373-386.
L. Mervart et al., "Precise Point Positioning with Ambiguity Resolution in Real-Time," Proceedings of the 21st International Technical Meeting of the Satellite Division of The Institute of Navigation (ION GNSS 2008), Savannah, GA, Sep. 2008, pp. 397-405.
Y. Mireault et al., "Online Precise Point Positioning," GPS World, Sep. 2008, pp. 59-64.
A. Niell, "Global mapping functions for the atmosphere delay at radio wavelengths," Journal of Geophysical Research, vol. 101, No. B2, pp. 3227-3246, Feb. 10, 1996.
S. Schaer, [IGSMAIL-287]: Monitoring (P1-C1) code biases, IGS Electronic Mail Message No. 2827, May 9, 2000, two pages.
G. Seeber, Satellite Geodesy, 2d. Ed., 2003, p. 31.
P. Tétrault et al., "CSRS-PPP: An Internet Servic e for GPS User Access to the Canadian Spatial Reference Frame," Geomatica, vol. 59, No. 1, 2005, pp. 17-28.
A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.
S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.
G. Wübbena, "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).
J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.
Non-Final Office Action of Jan. 5, 2015 for U.S. Appl. No. 13/522,329, 17 pages.
Notice of Allowance of Jun. 9, 2015 for U.S. Appl. No. 13/522,329, 7 pages.

* cited by examiner

Troposcaling Example

US 9,201,147 B2

GNSS SIGNAL PROCESSING WITH REGIONAL AUGMENTATION NETWORK

CROSS-REFERENCE TO RELATED APPLICATIONS

The following are related hereto and incorporated herein in their entirety by this reference: U.S. Provisional Application for Patent No. 61/277,184 filed 19 Sep. 2009; International Patent Application PCT/US2009/059552 filed 5 Oct. 2009; U.S. Provisional Application for Patent No. 61/195,276 filed 6 Oct. 2008; International Patent Application PCT/US/2009/004471 filed 5 Aug. 2009; International Patent Application PCT/US/2009/004473 filed 5 Aug. 2009; International Patent Application PCT/US/2009/004474 filed 5 Aug. 2009; International Patent Application PCT/US/2009/004472 filed 5 Aug. 2009; International Patent Application PCT/US/2009/004476 filed 5 Aug. 2009; U.S. Provisional Application for Patent No. 61/189,382 filed 19 Aug. 2008; U.S. patent application Ser. No. 12/224,451 filed 26 Aug. 2008, United States Patent Application Publication US 2009/0027625 A1; International Patent Application PCT/US07/05874 filed 7 Mar. 2007, International Publication No. WO 2008/008099 A2; U.S. patent application Ser. No. 11/988,763 filed 14 Jan. 2008, United States Patent Application Publication US 2009/0224969 A1; International Patent Application No. PCT/US/2006/034433 filed 5 Sep. 2006, International Publication No. WO 2007/032947 A1; U.S. Pat. No. 7,432,853 granted 7 Oct. 2008; International Patent Application No. PCT/US2004/035263 filed 22 Oct. 2004 and International Publication Number WO 2005/045463 A1; U.S. Pat. No. 6,862,526 granted 1 Mar. 2005; and U.S. Provisional Application for Patent No. 61/396,676, filed 30 May 2010

TECHNICAL FIELD

The present invention relates to the field of Global Navigation Satellite Systems GNSS). More particularly, the present invention relates to methods and apparatus for processing of GNSS data with regional augmentation for enhanced precise point positioning.

BACKGROUND ART

Global Navigation Satellite Systems (GNSS) include the Global Positioning System (GPS), the Glonass system, the proposed Galileo system, the proposed Compass system, and others. Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the United States Department of Defense (DoD). One signal is transmitted on L2, intended only for DoD-authorized users. Each GPS signal has a carrier at the L1 and L2 frequency, a pseudo-random number (PEN) code, and satellite navigation data. Two different PRN codes are transmitted by each satellite: a coarse acquisition (C/A) code and a precision (P/Y) code which is encrypted for DoD-authorized users. Each C/A code is a unique sequence of 1023 bits, which is repeated each millisecond. Other GNSS systems likewise have satellites which transmit multiple signals on multiple carrier frequencies.

FIG. 1 schematically illustrates a typical prior-art scenario to determine the position of a mobile receiver (rover). Rover 100 receives GPS signals from any number of satellites in view, such as SV1, SV2, and SVM, shown respectively at 110, 120 and 130. The signals pass through the earth's ionosphere 140 and through the earth's troposphere 150. Each signal has two frequencies, L1 and L2. Receiver 100 determines from the signals respective pseudo-ranges, PR1, PR2, . . . , PRM, to each of the satellites. Pseudo-range determinations are distorted by variations in the signal paths which result from passage of the signals through the ionosphere 140 and the troposphere 150, and from multipath effects, as indicated schematically at 160.

Pseudo-range can be determined using the C/A code with an error of about one meter, a civil receiver not using the military-only P/Y code determines rover position with an error in the range of meters. However, the phases of the L1 and L2 carriers can be measured with an accuracy of 0.01-0.05 cycles (corresponding to pseudo-range errors of 2 mm to 1 cm), allowing relative position of the rover to be estimated wish errors in the range of millimeters to centimeters. Accurately measuring the phase of the L1 and L2 earners requires a good knowledge of the effect of the ionosphere and the troposphere for all observation times.

Relative positioning allows common-mode errors to be mitigated by differencing the observations of the rover with observations of a reference station at a known location near the rover, e.g., within 50-100 km. The reference station observations can be collected at a physical base station or estimated from observations of a network of reference stations. See for example U.S. Pat. No. 5,477,458 "Network for Carrier Phase Differential GPS Corrections" and U.S. Pat. No. 5,899,957 "Carrier Phase Differential GPS Collections Network."

Precise point positioning (PPP), also called absolute positioning, uses a single GNSS receiver together with precise satellite orbit and clock data to reduce satellite-related error sources. A dual-frequency receiver can remove the first-order effect of the ionosphere for position solutions of centimeters to decimeters. The utility of PPP is limited by the need to wait longer than desired for the float position solution to converge to centimeter accuracy. And unlike relative positioning techniques in which common-mode errors are eliminated by differencing of observations, PPP processing uses undifferenced carrier-phase observations so that the ambiguity terms are corrupted by satellite and receiver phase biases. Methods have been proposed for integer ambiguity resolution in PPP processing. See, for example, Y. Gao et ah, GNSS Solutions: Precise Point Positioning and Its Challenges, Inside GNSS, November/December 2006, pp. 16-18. See also U.S. Provisional Application for Patent No. 61/277,184 filed 19 Sep. 2009 (TNL A-2585P).

Improved GNSS processing methods and apparatus are desired, especially to achieve faster convergence to a solution, improved accuracy and/or greater availability.

SUMMARY

Improved methods and apparatus for processing of GNSS data with augmentation for enhanced precise positioning are presented.

Some embodiments of the invention provide methods and/or apparatus for processing of GNSS data derived from multi-frequency code and carrier observations are presented which make available correction data for use by a rover located within the region, the correction data comprising: the ionospheric delay over the region, the tropospheric delay over the region, the phase-leveled geometric correction per satellite, and the at least one code bias per satellite.

Some embodiments provide methods and apparatus for determining a precise position of a rover located within a region in which a GNSS receiver is operated to obtain multi-frequency code and carrier observations and correction data, to create rover corrections from the correction data, and to determine a precise rover position using the rover observations and the rover corrections.

In some embodiments the correction data comprises at least one code bias per satellite, a fixed-nature MW bias per satellite and/or values from which a fixed-nature MW bias per satellite is derivable, and an ionospheric delay per satellite for each of multiple regional network stations and/or non-ionospheric corrections.

In some embodiments the correction data comprises at least one code bias per satellite, a fixed-nature MW bias per satellite and/or values from which a fixed-nature MW bias per satellite is derivable, and an ionospheric delay per satellite for each of multiple regional network stations and an ionospheric phase bias per satellite, and/or non-ionospheric corrections.

Some embodiments provide methods and apparatus for encoding and decoding the correction messages containing correction data in which network messages include network elements related to substantially all stations of the network and cluster messages include cluster elements related to subsets of the network.

Some embodiments provide regional correction data streams prepared in accordance with the methods and suitable for broadcast and use by mobile GNSS receivers within a network area.

Some embodiments provide computer program products embodying instructions for carrying out the methods.

BRIEF DESCRIPTION OF DRAWING FIGURES

These and other aspects and features of the present invention will be more readily understood from the embodiments described below with reference to the drawings, in which:

FIG. 1 schematically illustrates a typical prior-art scenario to determine a rover position;

FIG. 2 schematically illustrates a system in accordance with some embodiments of the invention;

FIG. 3 schematically illustrates a global network processor in accordance with some embodiments of the invention;

FIG. 4 schematically illustrates a regional network processor in accordance with some embodiments of the invention;

FIG. 5 schematically illustrates a regional network process in accordance with some embodiments of the invention;

FIG. 6 schematically illustrates augmented precise point positioning in accordance with some embodiments of the invention;

FIG. 7 schematically illustrates generating synthetic reference station data for augmented precise point positioning in accordance with some embodiments of the invention;

FIG. 8 schematically illustrates augmented precise point positioning wills differential processing in accordance with some embodiments of the invention;

FIG. 9 schematically illustrates augmented precise point positioning with differential processing in accordance with some embodiments of the invention;

FIG. 10 schematically illustrates augmented precise point positioning with differential processing accordance with some embodiments of the invention;

FIG. 11 schematically illustrates construction of synthetic reference station observations in accordance with some embodiments of the invention;

FIG. 12 schematically illustrates an ionospheric shell and a portion of a tropospheric shell surrounding the Earth;

Figure 16:
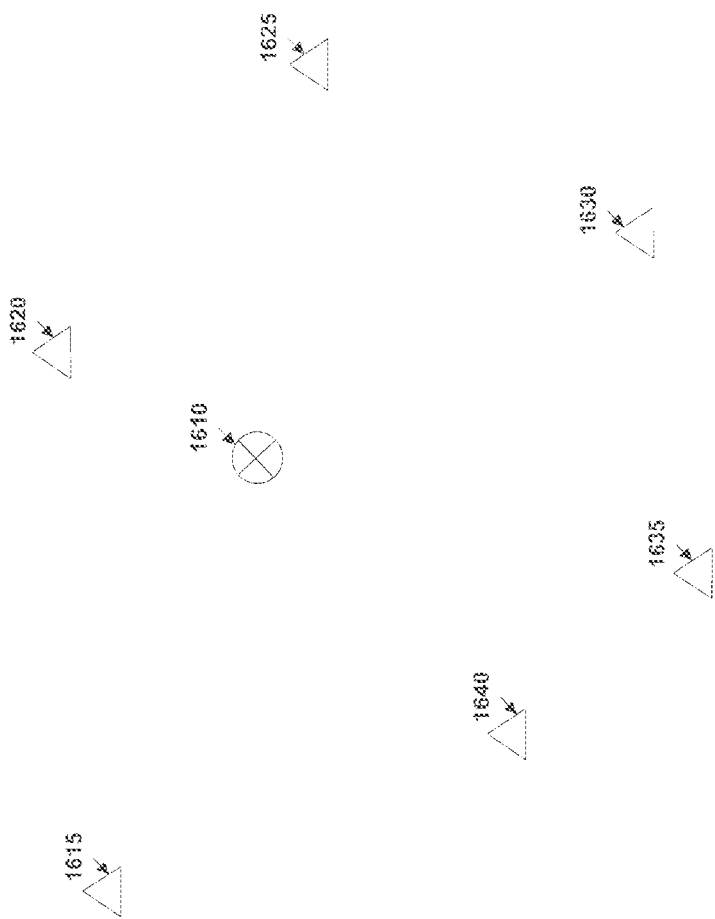
Figure 18:
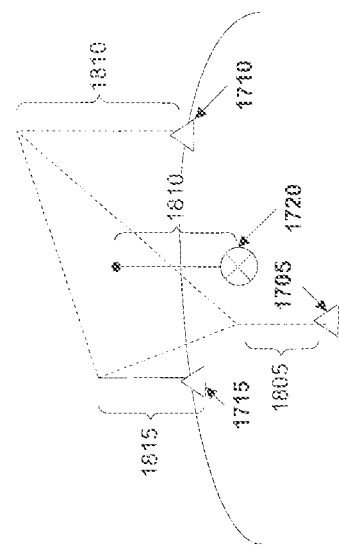
Figure 17:
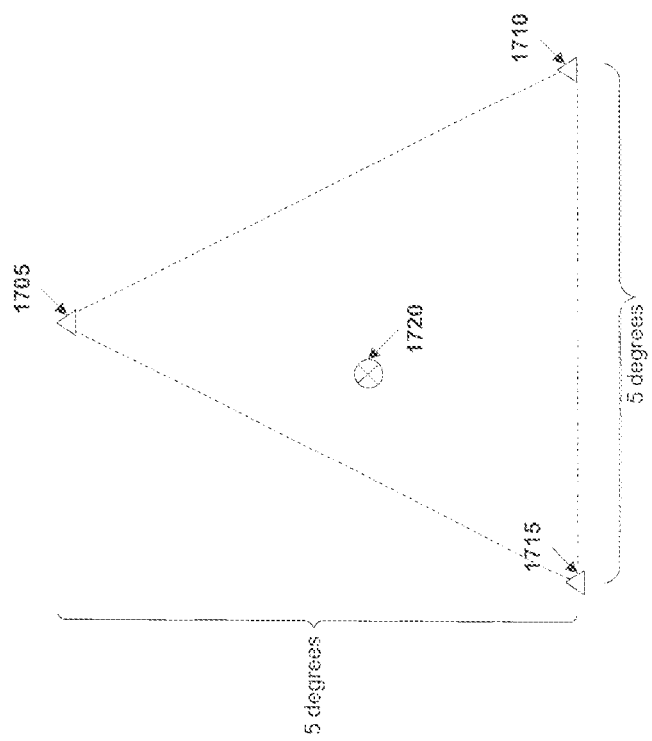
Figure 19:
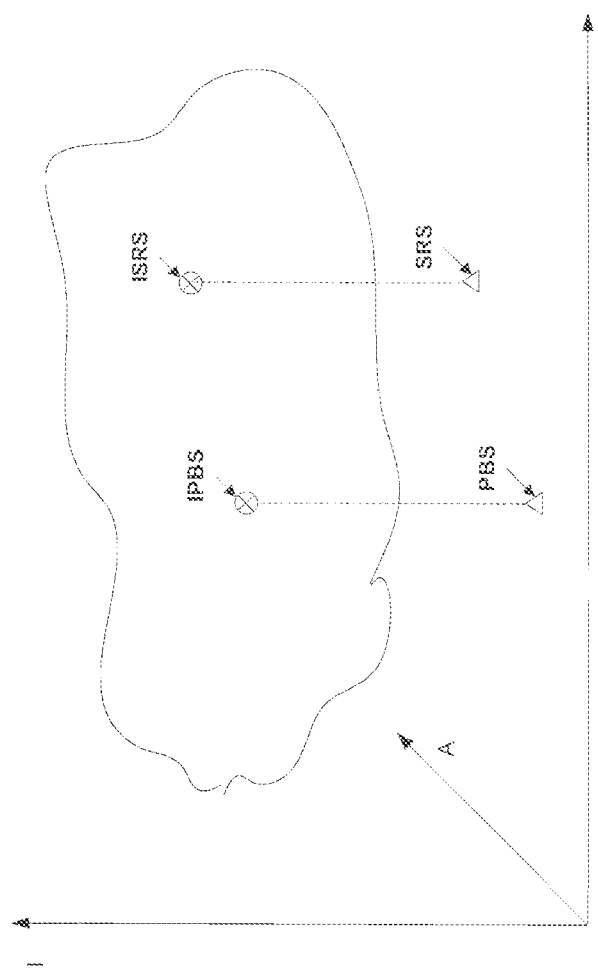
Figure 20:
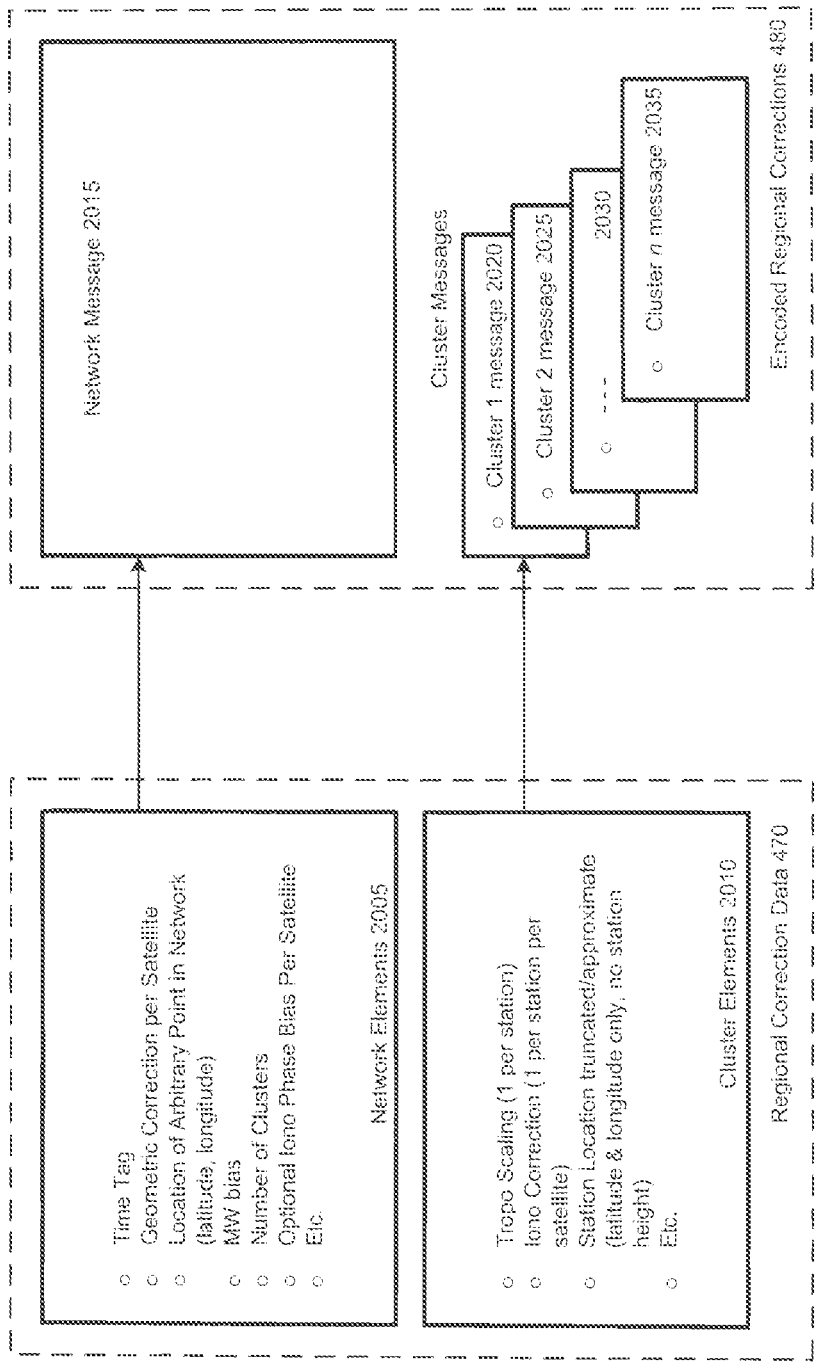
Figure 21:
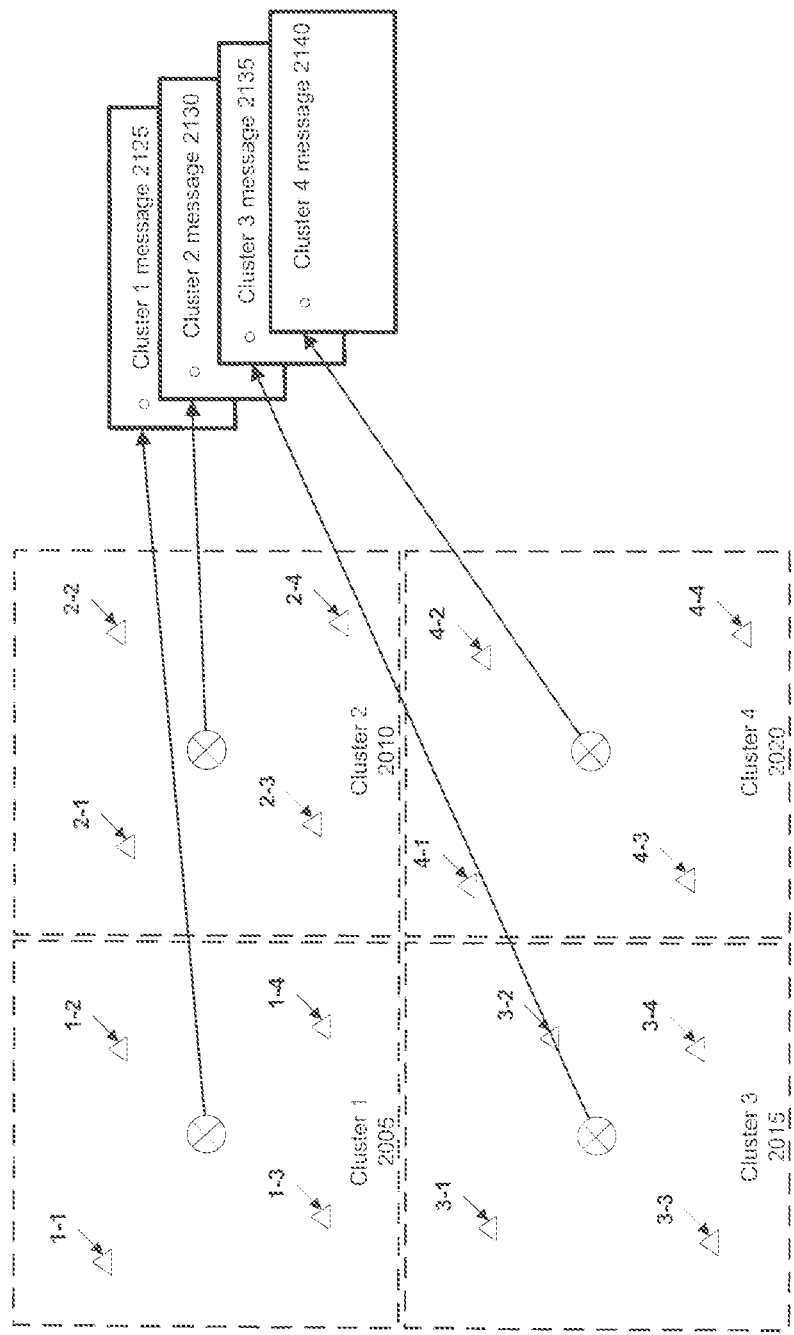
Figure 22:
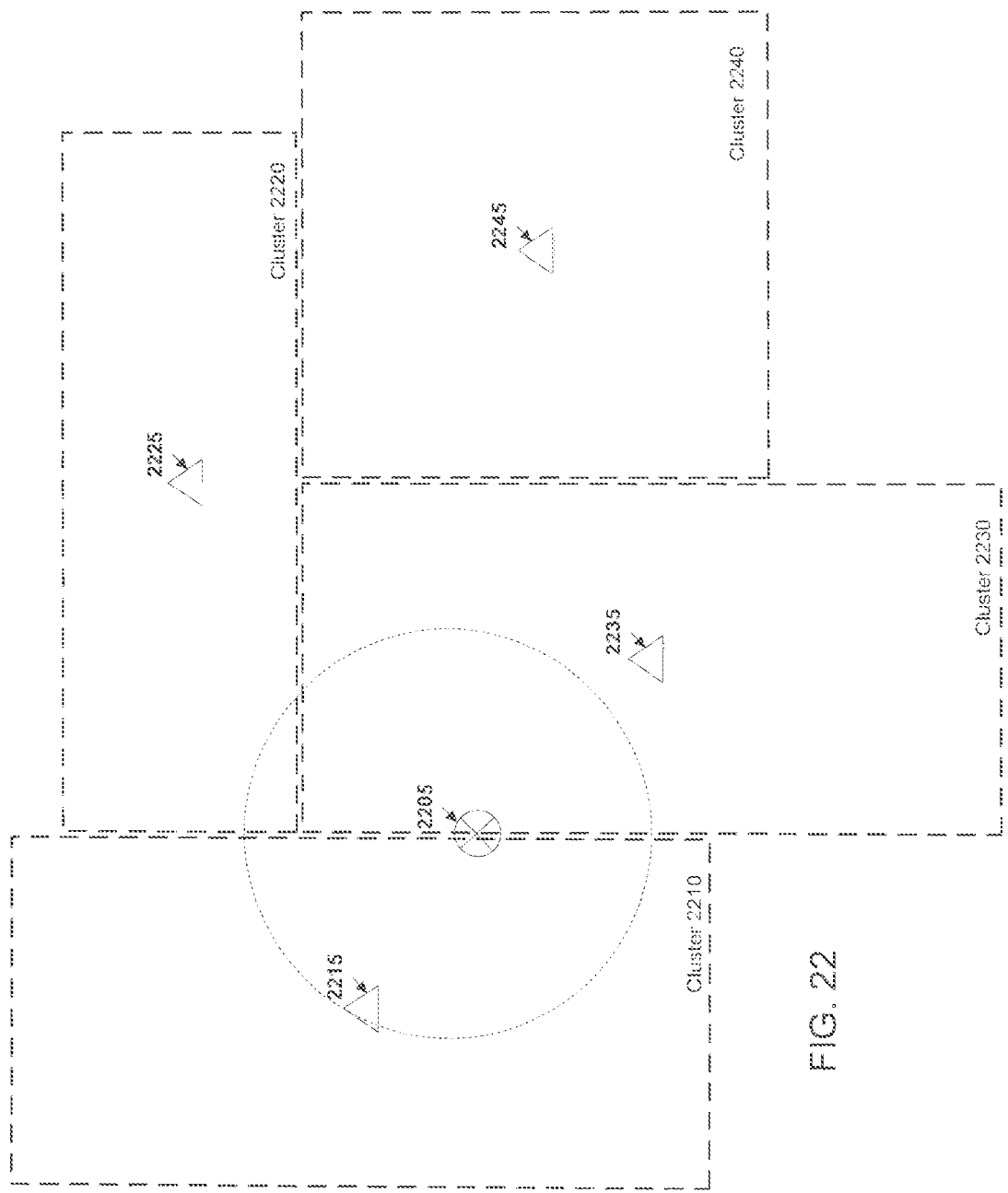
Figure 23:
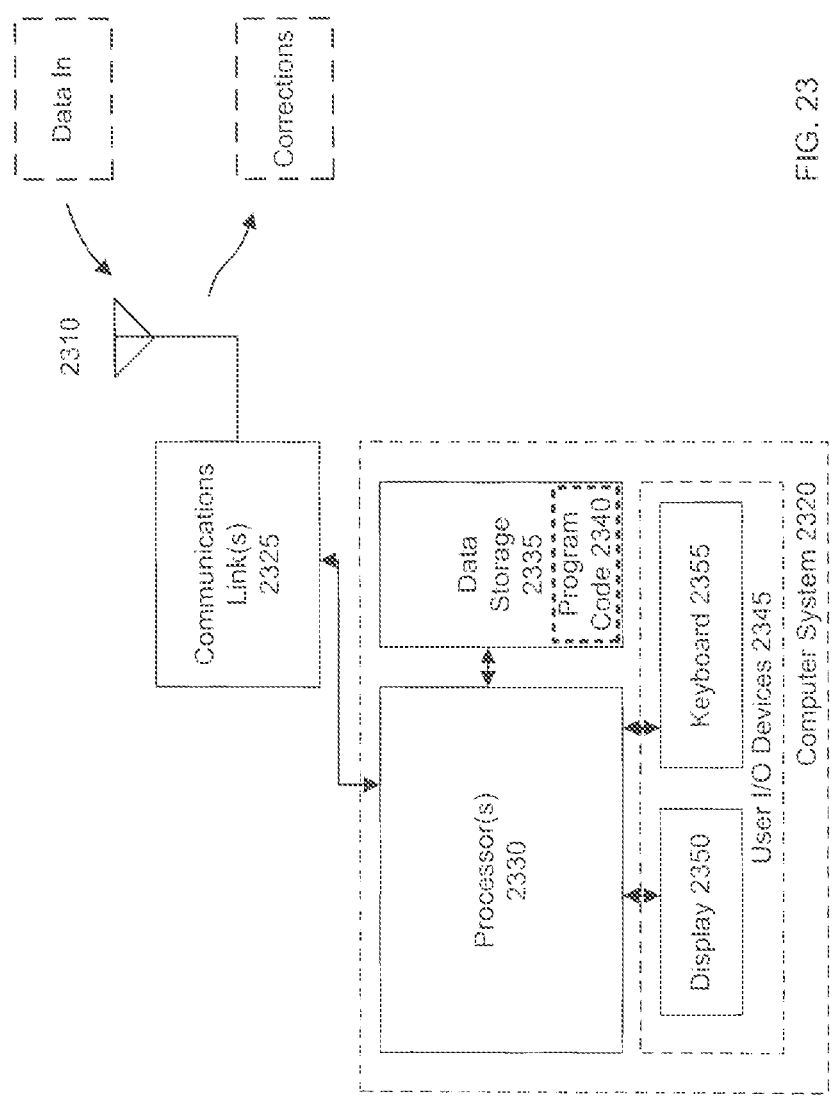
Figure 24:
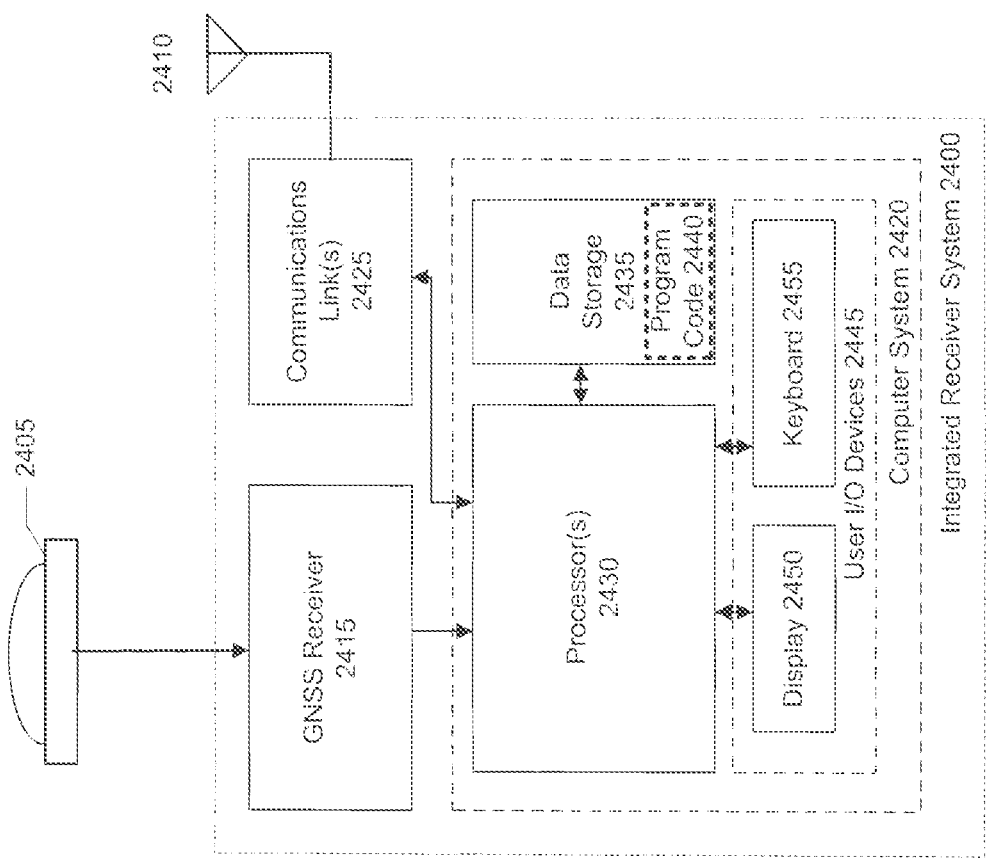

FIG. 16 schematically illustrates troposcaling in accordance with some embodiments of the invention;

FIG. 17 schematically illustrates spacing of locations for geometric correction terms are determined in accordance with some embodiments of the invention;

FIG. 18 schematically illustrates a linear model for determining the geometric correction at a rover location from geometric corrections three arbitrary locations in accordance with some embodiments of the invention;

FIG. 19 schematically illustrates ionospheric delay IPBS at a physical base station location PBS and ionospheric delay ISRS at a synthetic reference station location SRS;

FIG. 20 schematically illustrates regional correction, message encoding in accordance with some embodiments of the invention;

FIG. 21 schematically illustrates clusters of regional network stations in accordance with some embodiments of the invention;

FIG. 22 shows an example of a rover located within a regional network having clusters in accordance with some embodiments of the invention;

FIG. 23 is a schematic diagram of a computer system in accordance with some embodiments of the invention; and FIG. 24 is a schematic diagram of a GNSS receiver system in accordance with some embodiments of the invention;

DETAILED DESCRIPTION

Part 1: Introduction

Methods and apparatus in accordance with some embodiments involve making available and/or using correction data with rover observations of GNSS satellite signals for precise navigation or positioning of a rover located within a region. The correction data comprises (1) at least one code bias per satellite, i.e. a fixed-nature MW bias per satellite (or values from which a fixed-nature MW bias per satellite is derivable), (2) a phase-leveled geometric correction per satellite derived from the network fixed double difference ambiguities, and (3) an ionospheric delay per satellite for each of multiple regional network stations, and optionally an ionospheric phase bias per satellite, and/or non-ionospheric corrections.

The corrections are determined at least in part from code and carrier phase observations of GNSS satellite signals by reference stations of a network distributed over the region. The code bias is derived from fixed ambiguities (e.g., double-differenced) of the regional reference station network.

The corrections enable reconstruction of code and phase observations of the reference stations. The ability to reconstruct the geometric part (ionospheric-free observation combinations) is based on the phase-leveled geometric correction term per satellite. This geometric correction term encapsulates the integer nature of the ambiguity and compensates the orbit error and satellite clock error seen in the regional reference station network.

If m stations of the regional network observe n satellites, the transmission bandwidth needed to transmit m×n observations and m×n carrier observations on each GNSS frequency would be impractical. Some embodiments of the invention substantially reduce this bandwidth requirement. Only one or three geometric corrections is/are transmitted for each of the n satellites in accordance with some embodiments. Only one code bras is transmitted for each of the n satellites in accordance with some embodiments. Only one tropospheric value is optionally transmitted for each of the m stations. The non-ionospheric part of the regional network correction comprises the code biases, phase-leveled geometric correction and the optional tropospheric values.

In some embodiments, the ionospheric part of the regional reference station network correction is based on observation space. It is derived from the ionospheric carrier-phase dual-frequency combination minus the ambiguity determined from processing the regional network observations. Thus m×n ionospheric corrections are optionally transmitted for processing of rover observations.

In some embodiments, an absolute ionosphere model estimated from the network, or a global/regional ionosphere model like WAAS, TONEX or GAIM is used; an ionospheric phase bias per satellite and per station is derived together with, the ionospheric correction per satellite per station. Thus m×n Ionospheric corrections plus n ionospheric phase biases are optionally transmitted for processing of rover observations. Carrier phase observations of the regional network's reference stations (e.g., on carriers L1 and L2) can be folly reconstructed using the geometric part (phase-leveled geometric correction and tropospheric corrections) together with the ionospheric part (ionospheric corrections and optional ionospheric phase biases). If the optional tropospheric corrections are not provided, the tropospheric delay at the rover can be estimated in rover processing, at the cost of slower convergence.

Double differencing of the reconstructed observations of the regional network stations with raw L1 and L2 carrier-phase observations of the rover receiver results in ambiguity values which are close to integer.

Some advantages of this approach are:

No master station is required. This leads to a simpler algorithm for generating synthetic reference station, data and reduced burden for encoding and decoding the correction messages when, these are transmitted for processing of rover observations.

Multipath mitigation and noise reduction. The phase-leveled geometric correction term per satellite is generated using all stations in the regional reference station network. Reconstructed observations thus mitigate the multipath of all stations, instead of the inherent mitigation of the full multipath and noise of a master station. In addition, the ionospheric part is in some embodiments smoothed over time by the regional network processor to reduce noise.

Smooth transition from only global network corrections to global corrections augmented with regional corrections when the rover moves into a region covered by a regional network. The regional corrections add a geometric correction per satellite together with ionospheric and/or non-ionospheric corrections. When a rover moves into a region covered by a regional network, processing of the rover observations benefits immediately from the added regional corrections.

Bandwidth reduction. With a regional network of, for example, 80 reference stations tracking 12 satellites, a transmission bandwidth of about 2200-2500 bits/second should provide an update rate of 10 seconds even without optimizations (described below) that become possible because of the changed information content of the messages.

Part 2: Reconstructing Code and Carrier-Phase Observations
Part 2.1. Carrier-Phase Observation Bats with Fixed Double-Difference Ambiguities GPS $L_1$ and $L_2$ carrier phase observations can be expressed as:

$$L_1 = \lambda_1 \varphi_1 = \rho + T + I_1 + c \cdot (t_r - t^s) + b_1^r - b_1^s + \lambda_1 N_1 + v_1 \quad (1)$$

$$L_2 = \lambda_2 \varphi_2 = \rho + T + \frac{\lambda_2^2}{\lambda_1^2} I_1 + c \cdot (t_r - t^s) + b_2^r - b_2^s + \lambda_2 N_2 + v_2 \quad (2)$$

where
$L_1$ and $L_2$ are the $L_1$ and $L_2$ carrier phase observations in metric units,
$\varphi_1$ and $\varphi_2$ are the $L_1$ and $L_2$ carrier phase observations in cycles.
$\rho$ is the geometric range between antenna phase centers of satellite and receiver,
$T$ is the tropospheric delay,
$I_1$ is the $L_1$ ionospheric delay,
$t^s$ and $t_r$ are the satellite clock error and receiver clock error, respectively,
$b_1^s$ and $b_2^s$ are the satellite $L_1$ phase bias and satellite $L_2$ phase bias, respectively,
$b_1^r$ and $b_2^r$ are the receiver $L_1$ phase bias and satellite $L_2$ phase bias, respectively,
$N_1$ and $N_2$ are "true" $L_1$ and $L_2$ integer ambiguities, respectively, and
$v_1$ and $v_2$ are phase noise plus multipath of $L_1$ and $L_2$, respectively.

The ionospheric-free carrier-phase observation can be expressed as $$L_{IF} = \rho + T + c \cdot (t_r - t^s) + b_c^r - b_c^s + N_c + v_c \quad (3)$$

where $$N_c = \frac{\lambda_1 \lambda_2^2}{\lambda_2^2 - \lambda_1^2} N_1 + \frac{\lambda_1^2 \lambda_2}{\lambda_2^2 - \lambda_1^2} N_2 = \frac{\lambda_1 \lambda_2^2}{\lambda_2^2 - \lambda_1^2} N_w + \frac{\lambda_1 \lambda_2}{\lambda_1 + \lambda_2} N_2 \quad (4)$$

is the ionospheric-free ambiguity, $$b_c^r = \frac{\lambda_2^2}{\lambda_2^2 - \lambda_1^2} b_1^r - \frac{\lambda_1^2}{\lambda_2^2 - \lambda_1^2} b_2^r \quad (5)$$

and $$b_c^s = \frac{\lambda_2^2}{\lambda_2^2 - \lambda_1^2} b_1^s - \frac{\lambda_1^2}{\lambda_2^2 - \lambda_1^2} b_2^s$$

are respectively the receiver and satellite ionospheric-free satellite phase biases, and $$N_w = N_1 - N_2. \quad (6)$$

is the widelane ambiguity.

The ionospheric phase observation $L_{I1}$ mapped to frequency $L_1$ can be written as $$L_{I1} = \frac{\lambda_1^2}{\lambda_1^2 - \lambda_2^2}(L_1 - L_2) = I_1 + b_I^r - b_I^s + N_I + v_I \quad (7)$$

where $$N_I = \frac{\lambda_1^3}{\lambda_1^2 - \lambda_2^2} N_1 - \frac{\lambda_1^2 \lambda_2}{\lambda_1^2 - \lambda_2^2} N_2 = -\frac{\lambda_1^3}{\lambda_2^2 - \lambda_1^2} N_w + \frac{\lambda_1^2}{\lambda_1 + \lambda_2} N_2 \quad (8)$$

is the ionospheric ambiguity, and $$b_I^r = \frac{\lambda_1^2}{\lambda_2^2 - \lambda_1^2}(b_2^r - b_1^r) \text{ and} \qquad (9)$$

$$b_I^s = -\frac{\lambda_1^2}{\lambda_2^2 - \lambda_1^2}b_1^s + \frac{\lambda_1^2}{\lambda_1^2 - \lambda_2^2}b_2^s$$

are respectively the receiver and satellite ionospheric phase biases.

The formulas are simplified by forming the single difference of observations of two satellites at each reference station to cancel out receiver clock error and receiver phase bias. The single-difference L1 and L2 carrier-phase combinations are $$\nabla L_1 = \lambda_1 \nabla \varphi_1 = \nabla \rho + \nabla T + \nabla I_1 - c \cdot \nabla t^s + \nabla b_1^s + \lambda_1 \nabla N_1 + \nabla v_1 \qquad (10)$$

$$\nabla L_2 = \lambda_2 \nabla \varphi_2 = \nabla \rho + \nabla T + \frac{\lambda_2^2}{\lambda_1^2}\nabla I_1 - c \cdot \nabla t^s + \nabla b_2^s + \lambda_2 \nabla N_2 + \nabla v_2 \qquad (11)$$

The single difference ionospheric-free phase is then expressed as $$\nabla L_{IF} = \nabla \rho + \nabla T - c \nabla t^s + \nabla b_c^s + \frac{\lambda_1 \lambda_2^2}{\lambda_2^2 - \lambda_1^2}\nabla N_w + \frac{\lambda_1 \lambda_2}{\lambda_1 + \lambda_2}\nabla N_2 + \nabla v_c \qquad (12)$$

Assuming the single difference integer ambiguities estimated by the network processor are $\nabla \overline{N}_w, \nabla \overline{N}_2$, the estimated single-difference ionospheric-free satellite phase bias $\nabla \overline{b}_c^s$ can be derived as $$\nabla \overline{b}_c^s = \nabla L_c - \nabla \tilde{\rho} - \nabla \overline{T} + c \nabla \tilde{t}^s - \left(\frac{\lambda_1 \lambda_2^2}{\lambda_2^2 - \lambda_1^2}\nabla \overline{N}_w + \frac{\lambda_1 \lambda_2}{\lambda_1 + \lambda_3}\nabla \overline{N}_2\right) \qquad (13)$$

where
$\nabla \tilde{\rho}$ is the single difference geometric range computed from tire ephemeris,
$\nabla \tilde{t}^s$ is the single difference satellite clock error computed from the ephemeris, and
$\nabla \overline{T}$ is the single difference tropospheric delay estimated in the network processor.

If the satellite orbits and clocks are perfect and the tropospheric delays estimated from the network are also perfect, and ignoring the phase noise, the relationship of the derived single-difference ionospheric-free satellite phase bias $\nabla \overline{b}_c^s$ to the "true" bias $\nabla b_c^s$ is $$\nabla \overline{b}_c^s = \nabla b_c^s + \frac{\lambda_1 \lambda_2^2}{\lambda_2^2 - \lambda_1^2}(\nabla N_w - \nabla \overline{N}_w) + \frac{\lambda_1 \lambda_2}{\lambda_1 + \lambda_2}(\nabla N_2 - \nabla \overline{N}_2) \qquad (14)$$

$$= \nabla b_c^s + \frac{\lambda_1 \lambda_2^2}{\lambda_2^2 - \lambda_1^2}\nabla dN_w + \frac{\lambda_1 \lambda_2}{\lambda_1 + \lambda_2}\nabla dN_2$$

The derived single-difference ionospheric-free satellite phase bias is offset by a linear combination of integer widelane and L2 cycles if the fixed ambiguities are not equal to the "true" ambiguities. If the double difference ambiguities between all the reference stations are fixed correctly, this equation is valid for ah the stations A network-derived ionospheric-free phase bias per satellite is generated by combining the ionospheric-free biases derived from all stations (for example, by averaging or least squares). In reality, the orbit, clock computed from ephemeris and estimated tropospheric delay are not perfect, all the common errors mapped to hue of sight from receiver to satellite are absorbed by this satellite bias term. As this term preserves the integer nature of phase observations and purely geometric correction, this term is also called a phase-leveled geometric correction.

The single difference ionospheric phase observation can be expressed as $$\nabla L_{I1} = \nabla I_1 + \nabla b_I^s - \frac{\lambda_1^3}{\lambda_2^2 - \lambda_1^2}\nabla N_w + \frac{\lambda_1^2}{\lambda_1 + \lambda_2}\nabla N_2 + \nabla v_I. \qquad (15)$$

Ignoring the phase noise and assuming the satellite bias cannot be separated from the ionospheric delay, with the network derived single difference ambiguities the derived L1 ionospheric delay is expressed as:

$$\nabla \overline{I}_1 = \nabla L_{I1} + \left(\frac{\lambda_1^3}{\lambda_2^2 - \lambda_1^2}\nabla \overline{N}_w - \frac{\lambda_1^2}{\lambda_1 + \lambda_2}\nabla \overline{N}_2\right) \qquad (16)$$

$$= \nabla I_1 + \nabla b_I^s - \frac{\lambda_1^3}{\lambda_2^2 - \lambda_1^2}(\nabla N_w - \nabla \overline{N}_w) + \frac{\lambda_1^2}{\lambda_1 + \lambda_2}$$

$$(\nabla N_2 - \nabla \overline{N}_2)$$

$$= \nabla I_1 + \nabla b_I^s - \frac{\lambda_1^3}{\lambda_2^2 - \lambda_1^2}\nabla dN_w + \frac{\lambda_1^2}{\lambda_1 + \lambda_2}\nabla dN_2.$$

This is not the "true" ionospheric delay, but is biased by a combination of integer widelane, L2 cycles and an ionospheric phase bias.

Alternatively, if the absolute ionosphere model is estimated with the network data (for example as described in U.S. Provisional Application for Patent No. 61/396,676, filed 30 May 2010, the content of which is incorporated herein by this reference), or a global ionosphere model is available (for example WAAS, GAIM, or IONEX), by using Eq (15), the satellite ionosphere bias can be estimated with a least squares filter or Kalman filter. To avoid rank deficiency, one satellite bias can be set to zero, or a zero mean constraint (the sum of all satellite biases equal to zero) can be used.

The L1 ionospheric delay can be expressed as:

$$\nabla \overline{I}_1 = \nabla L_{I1} - \nabla \overline{b}_I^s + \left(\frac{\lambda_1^3}{\lambda_2^2 - \lambda_1^2}\nabla \overline{N}_w - \frac{\lambda_1^2}{\lambda_1 + \lambda_2}\nabla \overline{N}_2\right) \qquad (16a)$$

Where $\nabla \overline{b}_I^s$ the estimated single difference ionospheric phase bias.

The main difference between Eq (16) and Eq (16a) is that, in Eq (16a), the single-differenced ionospheric satellite phase bias $\nabla b_I^s$ is estimated with an ionosphere model and excluded from single-differenced ionospheric correction, while in Eq (16) the single-differenced ionospheric satellite phase bias $\nabla b_I^s$ is inherently included in the ionospheric delay.

In principle, with Eq (16), it is not necessary to estimate at; ionosphere model over the network as far as the network ambiguities can be fixed, i.e., with the MW combination to fix widelane ambiguities and ionospheric-free phase combination to fix narrowlane ambiguities. An advantage of this approach is that the system is insensitive to the activity of ionosphere. A disadvantage is that the derived ionospheric correction is not bias free. For satellite-to-satellite single-differenced ionospheric correction, it contains the single-differenced satellite ionospheric phase bias. For undifferenced ionospheric correction, it contains a satellite ionospheric phase bias and a receiver ionospheric phase bias. So the ionospheric correction generated with Eq (16) is only consistent in double difference. This means the computation of the ionospheric correction at a Synthetic Reference Station (SRS) location has to be done in differential way—difference between the SRS location and a nearby physical reference station (termed a Physical Base Station, or PBS) and then add to the ionospheric correction, from one of the physical reference stations. This implies that the SRS data cannot be generated for a satellite for which ambiguities are not fixed at the PBS. If there are only a few satellites in view at the SRS location or the satellite geometry is bad, this could lead to large positioning error for the rover.

In contrast, the ionospheric correction generated with Eq (16a) is consistent with the used absolute ionosphere model. By estimating the satellite/receiver ionospheric phase bias, the derived ionospheric corrections are consistent in undifferenced mode, so the generation of ionospheric correction at the SRS location does not rely on any physical reference station. Insofar as ambiguities are fixed for a satellite at some reference stations, the ionospheric correction can be generated for the SRS location. When used with tire ionospheric-free correction per satellite, the generated SRS data is fully synthetic.

With derived single difference ionospheric-free satellite phase bias and ionospheric delay/ionospheric satellite phase bias, L1 and L2 phase observations can be fully reconstructed. The reconstructed single difference L1 carrier phase is $$\nabla \widehat{L}_1 = \lambda_1 \nabla \hat{\varphi}_1 = \nabla \widehat{L}_c + \nabla \hat{I}_1 \quad (17)$$

$$= \nabla \rho + \nabla T - c\nabla t^s + \nabla b_c^s + \frac{\lambda_1 \lambda_2^2}{\lambda_2^2 - \lambda_1^2} \nabla dN_w +$$

$$\frac{\lambda_1 \lambda_2}{\lambda_1 + \lambda_2} \nabla dN_2 + \nabla I_1 + \nabla b_I^s + \frac{\lambda_1^3}{\lambda_1^2 - \lambda_2^2} \nabla dN_w +$$

$$\frac{\lambda_1^2}{\lambda_1 + \lambda_2} \nabla dN_2$$

$$= \nabla \rho + \nabla T - c\nabla t^s + \nabla I_1 + \nabla b_I^s + \lambda_1 (\nabla dN_w + \nabla dN_2)$$

$$= \nabla \rho + \nabla T - c\nabla t^s + \nabla I_1 + \nabla b_I^s + \lambda_1 \nabla dN_1$$

and the reconstructed single difference L2 carrier phase is $$\nabla \widehat{L}_2 = \lambda_2 \nabla \hat{\varphi}_2 = \nabla \widehat{L}_c + \nabla \hat{I}_1 \frac{\lambda_2^2}{\lambda_1^2} \quad (18)$$

$$= \nabla \rho + \nabla T - c\nabla t^s + \nabla b_c^s + \frac{\lambda_1 \lambda_2^2}{\lambda_2^2 - \lambda_1^2} \nabla dN_w +$$

$$\frac{\lambda_1 \lambda_2}{\lambda_1 + \lambda_2} \nabla dN_2 +$$

$$\left( \nabla I_1 + \nabla b_I^s + \frac{\lambda_1^3}{\lambda_1^2 - \lambda_2^2} \nabla dN_w + \frac{\lambda_1^2}{\lambda_1 + \lambda_2} \nabla dN_2 \right) \frac{\lambda_2^2}{\lambda_1^2}$$

$$= \nabla \rho + \nabla T - c\nabla t^s + \frac{\lambda_2^2}{\lambda_1^2} \nabla I_1 + \nabla b_2^s + \lambda_2 \nabla dN_2$$

Comparing Eq. (17) and Eq. (18) with Eq. (10) and Eq. (11), it can be seen that the reconstructed single difference L1 and L2 phases are the original phases plus an offset of integer ambiguity.

The formulas above are derived in satellite-to-satellite single differences. These apply to non-differenced observations if a receiver-dependent bias is added to each satellite observed at the reference station. The receiver bias term is absorbed by the receiver clock term.

Tropospheric delay is estimated in the regional network using zenith total delay (ZTD) per station or a troposcaling factor per station and using a standard tropospheric model (e.g. Neill, Hopfield, etc.) and a mapping function to map a tropospheric delay for line of sight from each reference station to each satellite, in some embodiments. The a priori tropospheric model used at the regional network processor is tire same as that used in processing of rover observations in some embodiments.

The relation between the estimated tropospheric delay to estimated zenith total delay and troposcaling can be written as:

$$T = ZTD \cdot MP = (1 + T_s) \cdot ZTD_{model} MP \quad (19)$$

where:
T is the tropospheric delay of a given satellite at a reference station.
ZTD is the estimated tropospheric zenith total delay at the reference station,
MP is the snapping function of the a priori troposphere model used in the network processor,
$T_s$ is the troposcaling factor, and
$ZTD_{model}$ is she zenith total delay computed from the a priori troposphere model.

Part 2.2 Reconstructing L1 and L2 Pseodorange Observations

For the narrow-lane pseudo-range combination $P_N$, narrow-lane code biases (derived, for example, from a global network) are applied to obtain integer nature wide-lane carrier phase ambiguities using wide-lane carrier minus narrow-lane code fibers; this is also known as the Melbourne-Wübbena (MW) wldelaning technique.

The constructed narrow-lane code combinations are bias free in the sense of a geometric pseudorange measurement if the MW code bias is estimated in the regional network processor. If the MW code bias is derived from another source (e.g., a global network) and applied in the regional network processor to determine widelane ambiguities, the constructed narrow-lane codes are also bias free. While it is not required that the narrowlane code be bias free, in some embodiments it is bias free.

The single difference narrowlane code and widelane phase can be written, respectively, as $$\nabla P_N = \nabla \rho + \nabla T - c\nabla t^s + \frac{\lambda_2^2}{(\lambda_2 - \lambda_1)^2} \nabla I_1 + \nabla B_N + \nabla \varepsilon_N, \quad (20)$$

$$\nabla L_W = \lambda_W \varphi_W = \quad (21)$$

$$\nabla \rho + \nabla T - c\nabla t^s + \frac{\lambda_2^2}{(\lambda_2 - \lambda_1)^2} \nabla I_1 + \nabla b_W + \lambda_W \nabla N_W + \nabla v_W.$$

The Melbourne-Wübbena combination is given by $$\lambda_W \nabla \overline{N}_W = \frac{\sum_{i=1}^{n}(\nabla L_W - \nabla P_N)}{n} + (\nabla b_W - \nabla B_N) = \frac{\sum_{i=1}^{n}(\nabla L_W - \nabla P_N)}{n} + \nabla B_{NW} \quad (22)$$

where $\nabla B_{NW}$ is the MW code bias derived, for example, by the global network processor. This MW code bias term $\nabla B_{NW}$ is a combination of code bias and carrier-phase bias and is used when fixing the widelane ambiguity in the network processing.

Narrowlane code observations and ionospheric-free code observations can be reconstructed respectively as $$\nabla \hat{P}_N = \nabla \widehat{L}_c + \frac{\lambda_2^2}{(\lambda_2 - \lambda_1)^2} \nabla I_1 + \nabla B_{NW} \quad (23)$$

$$\nabla \hat{P}_{IF} = \nabla \widehat{L}_{IF} \quad (24)$$

Finally, L1 code observations and L2 code observations can be reconstructed respectively as $$\nabla \hat{P}_1 = \nabla \widehat{L}_{IF} - \nabla I_1 + \alpha \nabla B_{NW} \quad (25)$$

$$\nabla \hat{P}_2 = \nabla \widehat{L}_{IF} - \frac{\lambda_2^2}{\lambda_1^2} \nabla I_1 + \beta \nabla B_{NW} \quad (26)$$

where $\alpha = \frac{\lambda_1}{\lambda_2}$ and $\beta = \frac{\lambda_2}{\lambda_1}$.

By using these two factors, the MW code bras term is cancelled out in she ionospheric-free code combination and is only present in narrowlane code combination.

In summary, the regional network processor generates correction terms comprising a code bias per satellite and at least one of an ionospheric delay per satellite and a non-ionospheric correction. They may include:

A satellite-dependent bias term per satellite derived from the network fixed double difference ambiguities. This bias term encapsulates the integer nature of the ambiguities and compensates the orbit error and satellite clock error seen its the regional reference station network (Eq. 13).

A tropospheric zenith total delay per station or troposcaling per station (Eq. 19).

An ionospheric correction per station per satellite (Eq. 16) or, alternatively, art ionospheric correction per station per satellite plus an ionospheric phase bias per satellite Eq. (16a).

An MW code bias term. This term can be derived from a global network processor or regional network (Eq.22). For an explanation of the satellite dependent bias term, also called "uncalibrated phase delays" ("UPD"), see Ge et al., "Resolution of GPS carrier-phase ambiguities in Precise Point Positioning (PPP) with daily observations," Journal of Geodesy, Vol. 82, No. 7, July 2008, pages 401-412.

Code observations and carrier-phase observations of each reference station in the regional network can be reconstructed using these corrections.

Part 2.3 Constructing Synthetic Reference Station Data for Processing of Rover Observations The construction of synthetic reference station (SRS) data is similar to the reconstruction of pseudorange and carrier phase data at a reference station described in Part 2.2 above, except that the tropospheric delays are derived (or interpolated) from the troposcaling (zenith total delay) corrections and the and the ionosphere delays are derived (or interpolated) from the ionospheric corrections supplied by the regional network.

For example, constructed observations for an SRS location within the region of the regional network are given by $$\widehat{L}_{1_{SRS}} = \lambda_1 \hat{\varphi}_{1_{SRS}} = (\tilde{\rho}_{SRS} - c\tilde{t}^s + \overline{b}_c^s) + I_{1_{SRS}} + T_{SRS}, \quad (27)$$

$$\widehat{L}_{2_{SRS}} = \lambda_2 \hat{\varphi}_{2_{SRS}} = (\tilde{\rho}_{SRS} - c\tilde{t}^s + \overline{b}_c^s) + \frac{\lambda_2^2}{\lambda_1^2} I_{1_{SRS}} + T_{SRS}, \quad (28)$$

$$T_{SRS} = (TS_{SRS} + 1) \cdot ZTD_{model_{SRS}} \cdot MP, \quad (29)$$

where:

$\widehat{L}_{1_{SRS}}$ is the constructed SRS L1 carrier-phase observation in metric units, $\widehat{L}_{2_{SRS}}$ is the constructed SRS L2 carrier-phase observation in metric units, $\hat{\varphi}_{1_{SRS}}$ is the constructed SRS L1 carrier-phase observation in cycles, $\hat{\varphi}_{2_{SRS}}$ is the constructed SRS L2 carrier-phase observation in cycles, $\tilde{\rho}_{SRS}$ is the geometric range from the selected (SRS) location to the satellite computed from ephemeris (precise orbits 350 and clocks 375 from global network processor, or IGU URO; or broadcast orbits and clocks from satellite navigation message or any other source of orbits and clock with enough accuracy to correctly fix ambiguities in the regional network processor; the required accuracy depends on the size of the regional network), $\tilde{t}^s$ is the satellite clock error computed from ephemeris, $\overline{b}_c^s$ is the phase-leveled geometric correction derived from the network processing, $I_{1_{SRS}}$ is the ionospheric correction mapped to GPS L1 frequency for the selected (SRS) location, $T_{SRS}$ is the tropospheric correction for the selected (SRS) location, and $TS_{SRS}$ is the troposcaling for the selected (SRS) location from regional network troposcaling estimation.

Synthetic reference station (SRS) observations are in some embodiments generated its an SRS module. The SRS module can be situated at the regional network processor (at the "server side," e.g., in a server computer), at the rover (at the "rover side," e.g., in the rover processor or in a client computer associated with the rover), or at any other suitable location.

If the SRS observations are generated at the regional network processor, the ephemeris used to generate SRS corrections can be exactly the same as the one used in the network processing, $\overline{b}_c^s$ can be used directly to generate SRS observations.

However, if the SRS observations are generated on the rover side, transmission latency and data corruption via the communication link from network processor to rover side processor may make it impractical or impossible to assure the same ephemeris is used unless a complicated validation algorithm is implemented. Instead, in sense embodiments a geometric correction which contains geometric range for art arbitrary location combined with (minus) satellite clock error and (plus) satellite bias is transmitted. This geometric correction term carries over to the rover side the orbit and clock used on the server side, avoiding the need to maintain consistency of orbit and clock between server side and rover side.

In addition, if this geometric correction term is transmitted for three arbitrary locations (e.g., within the region of the regional network), a linear model can be used to compensate the satellite orbit error for other locations (e.g., the selected SRS location which may be a rover location known only with low accuracy). A linear model is suitable for this purpose because the orbit error mapped to line of sight is very linear over a local region.

The corrected geometric range computed for a given location i is written as:

$$G_i = \tilde{\rho}_i - c\tilde{t}^s + \bar{b}_c^s \quad (30)$$

where
$\tilde{\rho}_i$ is the geometric range computed from server ephemeris,
$\tilde{t}^s$ is the satellite clock error, and
$\bar{b}_c^s$ is ionospheric-free carrier phase satellite bias derived from the network processing.

Geometric range $\breve{\rho}_i$ and satellite clock error $\breve{t}^s$ can be computed (e.g., at the rover) for the same location using the satellite's broadcast navigation message (broadcast ephemeris). The geometric range difference $d\rho_i$ between the geometric range $\breve{\rho}_i$ computed from broadcast ephemeris adjusted for broadcast satellite clock error $\breve{t}^s$ and the geometric correction $G_i$ from the regional network: for the same location is $$d\rho_i = (\breve{\rho}_i - c\breve{t}^s) - G_i \quad (31)$$

With geometric range correction values $dr_i$ for three locations in the network region, a linear model is used in some embodiments to calculate a geometric range correction $d\rho_{SRS}$ for a selected (SRS) location within the network region. The corrected geometric range for the selected (SRS) location is then $$G_{SRS} = (\breve{\rho}_{SRS} - \breve{t}^s) - d\rho_{SRS} \quad (32)$$

where
$\breve{\rho}_{SRS}$ is the geometric range from satellite to the selected (SRS) location determined from the broadcast ephemeris,
$\breve{t}^s$ is the satellite clock error determined from the broadcast ephemeris, and
$d\rho_{SRS}$ is the geometric range correction for the selected (SRS) location.

In this case, the rover does not require precise orbit and clock; broadcast orbit and clock information is sufficient. Spacing between the three arbitrary locations should be large enough and with good geometry to minimize the error of building the linear model.

In some embodiments the geometric bias per satellite is transmitted to the SRS module (e.g., at the rover) for each epoch of synthetic reference station data to be generated. Eq. (27) and Eq. (28) can be rewritten respectively for the SRS location as $$\tilde{L}_{1_{SRS}} = \lambda_1 \tilde{\phi}_{1_{SRS}} = G_{SRS} + I_{1_{SRS}} + T_{SRS} \quad (33)$$

$$\tilde{L}_{2_{SRS}} = \lambda_2 \tilde{\phi}_{2_{SRS}} = G_{SRS} + \frac{\lambda_2^2}{\lambda_1^2} I_{1_{SRS}} + T_{SRS} \quad (34)$$

Troposcaling and ionospheric correction for the selected (SRS) location are computed for example using interpolation, least squares adjustment with the troposcaling, and ionospheric correction from the reference stations. While the coordinates of the reference stations are used in troposcaling and residual interpolation, a resolution of 10 m to 100 m is sufficient for this purpose.

A method used in some embodiments is the WLIM (Weighted linear Interpolation Method), in which a linear model centered at SRS location is computed using least square adjustment with she corrections from at least three reference stations.

$$\begin{bmatrix} r_1 \\ r_2 \\ \vdots \\ r_n \end{bmatrix} = \begin{bmatrix} 1 & \Delta N_1 & \Delta E_1 \\ 1 & \Delta N_2 & \Delta E_2 \\ \vdots & \vdots & \vdots \\ 1 & \Delta N_n & \Delta E_n \end{bmatrix} \begin{bmatrix} a \\ b \\ c \end{bmatrix} \text{ or } R = AX \quad (35)$$

where
$r_i$ (i=1, 2, ... n) are troposcaling values at each of n reference stations, or ionospheric correction of a satellite (or satellite to satellite difference of observations at a reference station) for each of n reference stations,
$\Delta N_i$, $\Delta E_i$ are the north and east coordinate differences, respectively, from the selected (SRS) location to the reference stations, and
a, b, c are estimates for constant part, north and cast gradient.

Using least squares adjustment gives an estimate X where
$$X = (A^T P A)^{-1} A^T P R, \quad (36)$$

where
P is a distance-dependent weighting matrix,
and a corresponding variance of unit weight: $\sigma_0^2$ where $$\sigma_0^2 = \frac{V^T P V}{n - 3} \quad (37)$$

and a co-variance matrix Q for X:
$$Q = \sigma_0^2 \cdot (A^T P A)^{-1} \quad (38)$$

In some embodiments, the troposcaling correction for a selected (SRS) location is obtained by taking the constant part from the model, because the model is centered at the SRS location. For ionospheric correction, this method is applicable only when the ionospheric delay per satellite/per station is computed with Eq(16a).

In some embodiments, the troposcaling correction and/or ionospheric correction for a selected (SRS) location is/are obtained by taking the difference between the SRS location and the nearest reference station to the SRS location, and adding the respective troposcaling/ionospheric correction of that reference station $$r_{SRS} = BX + r_1 \text{ and } \sigma_{SRS}^2 = B Q B^T \quad (39)$$

where
B=[0 $\Delta N$ $\Delta E$] and $\Delta N$, $\Delta E$ are the respective north coordinate difference and cast coordinate difference between the SRS and nearest reference station to SRS location, and
$r_1$ is the troposcaling/ionospheric correction respectively of the nearest reference station.

Part 3: System Overview

Figure 2:
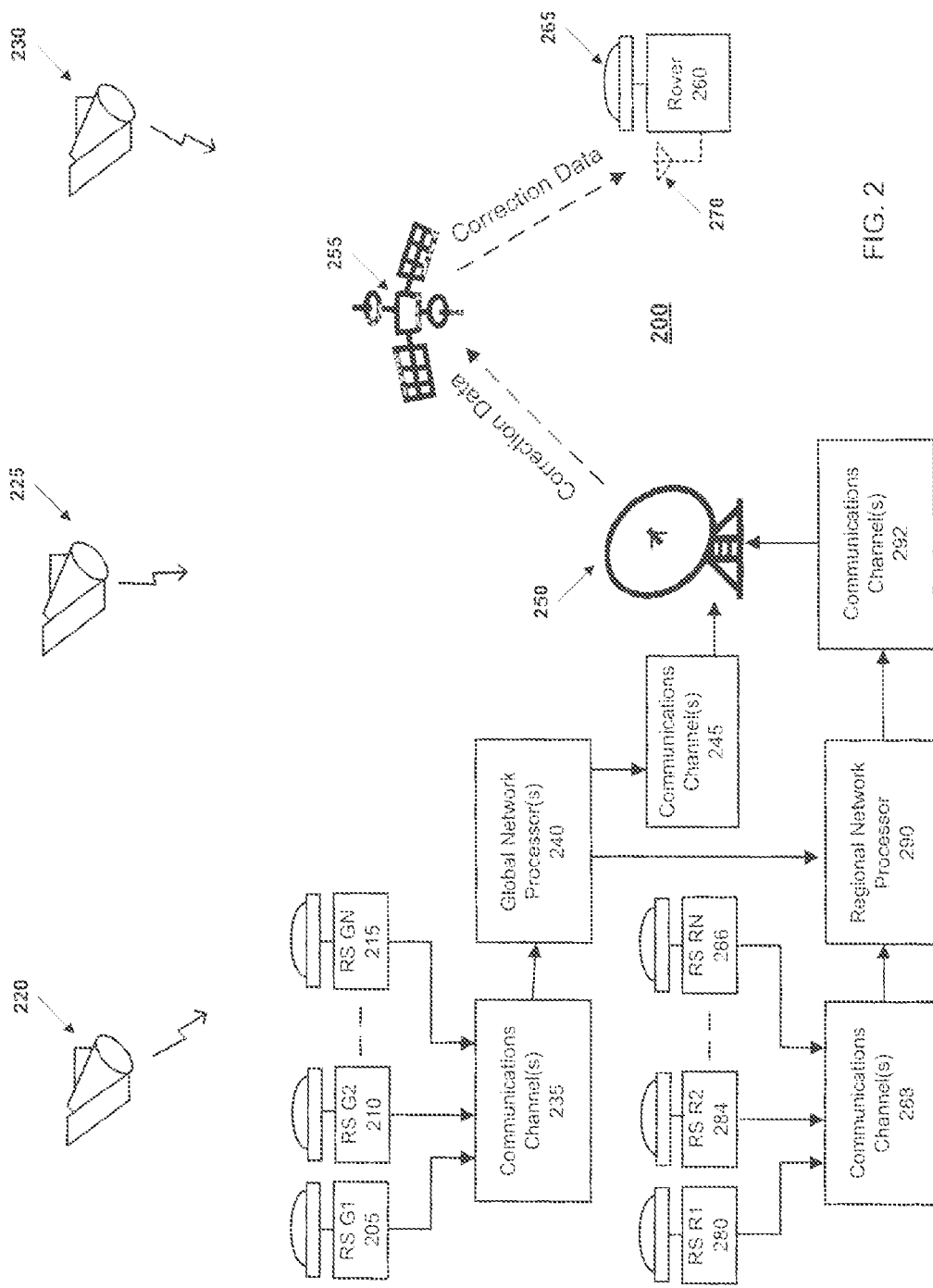

FIG. 2 schematically illustrates a system 200 in accordance with some embodiments of the invention. Reference stations of a global (worldwide) tracking network, such as reference stations 205, 210, ... 215, are distributed about the Earth with the aim of having substantially continuous observability of most or all GNSS satellites. The position of each reference station is known very precisely, e.g., within less than 2 cm.

Each reference station is equipped with art antenna and tracks the GNSS signals transmitted by the satellites in view at that station, such as GNS satellites 220, 225, ... 230. The GNSS signals have codes modulated on each of two or more carrier frequencies. Each reference station of the global network acquires GNSS data 305 representing, for each satellite in view at each epoch, carrier-phase (carrier) observations of at least two carriers, and pseudorange (code) observations of the respective codes modulated on at least two carriers. The reference stations also obtain the broadcast navigation message with almanac and ephemerides of the satellites from the satellite signals. The almanac contains the rough position of all satellites of the GNSS, while the so-called broadcast ephemerides provide more precise predictions (ca. 1 m) of the satellites' positions and the satellites' clock error (ca. 1.5 m) over specific time intervals.

Figure 1:
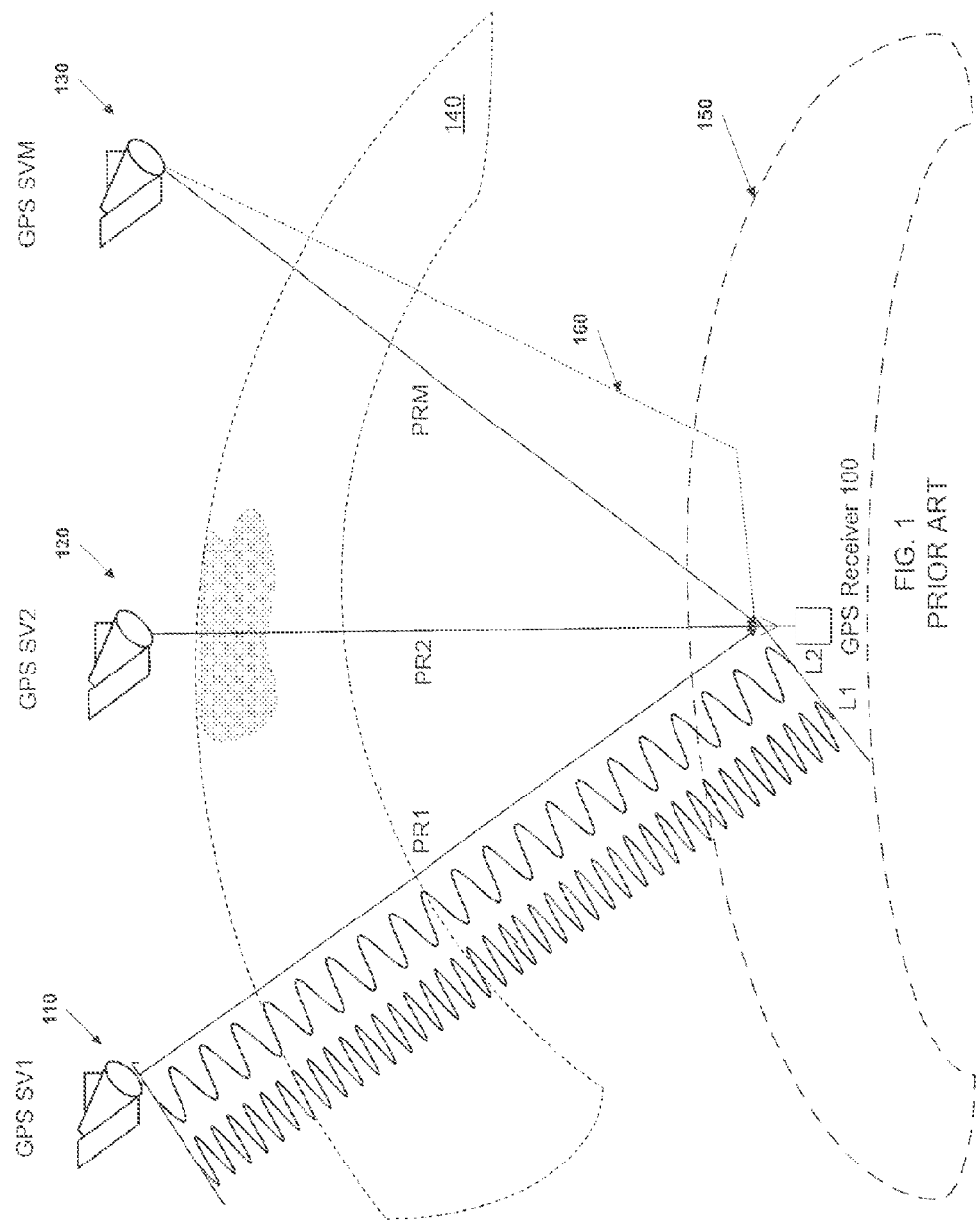

GNSS data collected at the reference stations of the global network are transmitted via communications channels 235 to a global network processor 240. Global network processor 240 uses the GNSS data from the reference stations of the global network with other information to generate a global correction message containing precise satellite position and clock data, as described for example in U.S. Provisional Application for Patent No. 61/277,184 filed 19 Sep. 2009 (TNL A-2585P). The global correction message is transmitted for use by any number of GNSS rover receivers. The global correction message is transmitted for example as shown in FIG. 2 via communications channel/s 245 and an uplink 250 and a communications satellite 255 for broadcast over a wide area; any other suitable transmission medium may be used including but not limited to radio broadcast or mobile telephone link. Rover 260 is an example of a GNSS rover receiver having a GNSS antenna 265 for receiving and tracking the signals of GNSS satellites in view at its location, and optionally having a communications antenna 270. Depending on the transmission band of the global correction message, it can be received by rover 260 via GNSS antenna 265 or communications antenna 270. The system of FIG. 1 as described thus far is as described in U.S. Provisional Application for Patent No. 61/277,184 filed 19 Sep. 2009 (TNL A-2585P).

FIG. 2 shows additional elements of a system in accordance with embodiments of the present invention. Reference stations of a regional (local) Stacking network, such as reference stations 280, 282, ... 284, are distributed within a region of the Earth with the aim of observing GNSS satellites when they are visible over the region. The position, of each reference station is known very precisely, e.g., within less than 2 cm. Each reference station is equipped with an antenna and tracks the GNSS signals transmitted by the satellites in view at that station, such as GNS satellites 220, 225 ... 230. Each reference station of the regional network acquires GNSS data representing, for each satellite in view at each epoch, carrier-phase (carrier) observations of at least two carriers, and pseudorange (code) observations of the respective codes modulated on at least two carriers. The regional reference stations typically also obtain tire broadcast navigation message with almanac and ephemerides of the satellites from the satellite signals.

GNSS data collected at the reference stations of the regional network are transmitted via communications channels 288 to a regional network processor 290. Regional network processor 290 uses the GNSS data from the reference stations of the regional network, with other information to generate a regional correction message containing correction data as described below. The regional correction message is transmitted for use by any number of GNSS rover receivers within the region of the regional network. The regional correction message is transmitted for example as shown in FIG. 2 via communications channel/s 292 and an uplink such as uplink 250 and a communications satellite 255; any other suitable transmission medium may be used including but nest limited to radio broadcast or mobile telephone link. The regional correction message can also be transmitted using an uplink and/or communications satellite other titan those used for the global network message.

Part 3: Global Network Corrections

Figure 3:
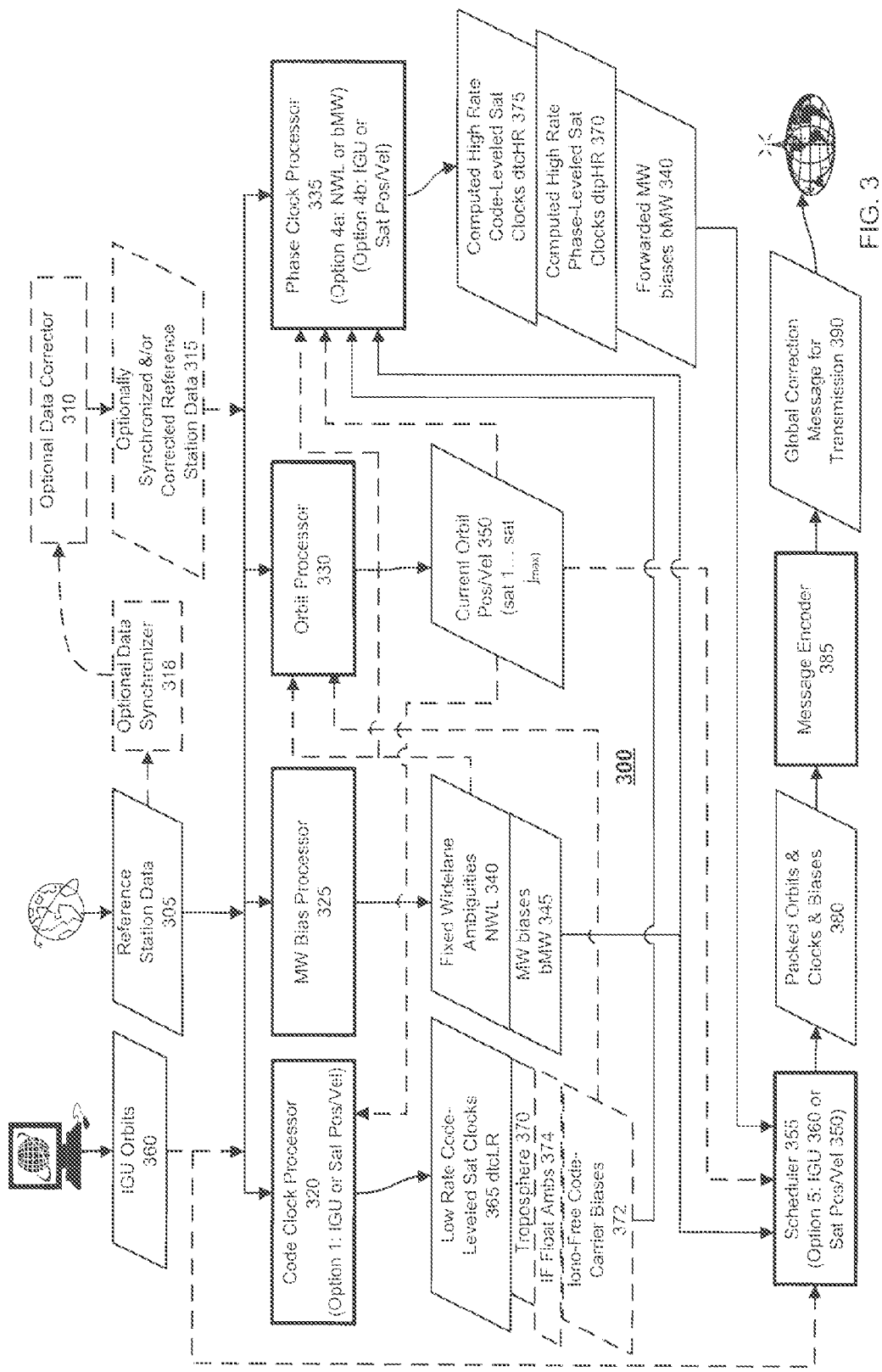

FIG. 3 is a schematic diagram showing principal components of the process flow 300 of a global network processor 240. Detailed description is provided in U.S. Provisional Application for Patent No. 61/277,184 filed 19 Sep. 2009 (TNL A-2585P). Data from the global network of reference stations are supplied without corrections as GNSS data 305 or after correction by an optional data corrector 310 as corrected GNSS data 315, to four processors: a code clock processor 320, a Melbourne-Wübbena (MW) bias processor 325, an orbit processor 330, and a phase clock processor 335.

Data corrector 310 optionally analyzes the raw GNSS data 305 from each reference station to check for quality of the received observations and, where possible, to correct the data for cycle slips, which are jumps in the carrier-phase observations occurring, e.g., each time the receiver has a loss of lock. Commercially-available reference stations typically detect cycle slips and flag the data accordingly. Cycle slip detection and correction techniques are summarized, for example, in g. Seeber. SATELLITE GEODESY, $2^{nd}$ Ed. (2003) at pages 277-281. Data corrector 310 optionally applies other corrections. Though not all corrections are needed for all she processors, they do no harm if applied to the data. For example as described below some processors use a linear combination of code and carrier observations in which some uncorrected errors are canceled in forming the combinations.

Observations are acquired epoch by epoch at each reference station and transmitted with time tags to the global network processor 240. For some stations the observations arrive delayed. This delay can range between milliseconds and minutes. Therefore an optional synchronizer 318 collects the data of the corrected reference station data within a predefined time span and passes the observations for each epoch as a set to the processor. This allows data arriving with a reasonable delay to be included in an epoch of data.

The MW bias processor 325 takes either uncorrected GNSS data 305 or corrected GNSS data 315 as input, since it uses the Melbourne-Wübbena linear combination which cancels out all but the ambiguities and the biases of the phase and linear observations. Thus only receiver and satellite antenna corrections are important for the widelane processor 325. Based on this linear combination, one MW bias per satellite and one widelane ambiguity per receiver-satellite pairing are computed. The biases are smooth (not noisy) and exhibit only some sub-daily low-rate variations. The widelane ambiguities are constant and can be used as long as no cycle slip occurs in the observations on the respective satellite-receiver link. Thus the bias estimation is not very time critical and can be run, e.g., with a 15 minute update rate. This is advantageous because the computation time grows with the third power of the number of stations and satellites. As an example, the computation time for a global network with 80 stations can be about 15 seconds. The values of fixed widelane ambiguities 340 and/or widelane biases 345 are optionally used in the orbit processor 330 and/or the phase clock processor 335, and/or are supplied to a scheduler 355. MW bias processor 325 is described in detail its Part 7 of U.S. Provisional Application for Patent No. 61/277,184 filed 19 Sep. 2009 (TNL A-2585P), attached as Appendix A.

Some embodiments of orbit processor 330 are based on a prediction-correction strategy. Using a precise force model and starting with an initial guess of the unknown values of the satellite's parameters (initial position, initial velocity and dynamic force model parameters), the orbit of each satellite is predicted by integration of the satellite's nonlinear dynamic system. The sensitivity matrix containing the partial derivatives of the current position to the unknown parameters is computed at the same time. Sensitivities of the initial satellite state are computed at the same time for the whole prediction. That is, starting with a prediction for the unknown parameters, the differential equation system is solved, integrating the orbit to the current time or into the future. This prediction can be linearized into the direction of the unknown parameters. Thus the partial derivatives (sensitivities) serve as a measure of the size of the change its the current satellite states if the unknown parameters are changed, or vice versa.

In some embodiments these partial derivatives are used in a Kalman fitter to improve the initial guess by projecting the GNSS observations to the satellite's unknown parameters. This precise initial state estimate is used to again integrate the satellite's dynamic system and determine a precise orbit. A time update of the initial satellite state to the current epoch is performed from time to time. In some embodiments, ionospheric-free ambiguities are also states of the Kalman filter. The fixed widelane ambiguity values 340 are used to fix the ionospheric-free ambiguities of the orbit processor 330 to enhance the accuracy of the estimated orbits. A satellite orbit is very smooth and can be predicted for minutes and hours. The precise orbit predictions 350 are optionally forwarded to the standard clock processor 320 and to the phase clock processor 335 as well as to a scheduler 355.

Ultra-rapid orbits 360, such as IGU orbits provided by the International GNSS Service (IGS), can be used as an alternative to the precise orbit predictions 355. The IGU orbits are updated tour times a day and are available with a three hour delay.

Standard clock processor 320 computes code-leveled satellite clocks 360 (also called standard satellite clocks), using GNSS data 305 or corrected GNSS data 315 and using precise orbit predictions 355 or ultra-rapid orbits 365. Code-leveled means that the clocks are sufficient for use with ionospheric-free code observations, but not with carrier-phase observations, because the code-leveled clocks do not preserve the integer nature of the ambiguities. The code-leveled clocks 360 computed by standard clock processor 320 represent clock-error differences between satellites. The standard clock processor 320 uses the clock errors of the broadcast ephemerides as pseudo observations and steers the estimated clocks to GPS time so that they can be used to compute, e.g., she exact time of transmission of a satellite's signal. The clock errors change rapidly, but for the use with code measurements, which are quite noisy, an accuracy of some centimeter is enough. Thus a "low rate" update rate of 30 seconds to 60 seconds is adequate. This is advantageous because computation time grows with the third power of number of stations and satellites. The standard clock processor 325 also determines troposphere zenith delays 365 as a byproduct of the estimation process. The troposphere zenith delays and the code-leveled clocks are sent to the phase clock processor 335. Standard clock processor 320 is described in detail in Part 6 of U.S. Provisional Application for Patent No. 61/277,184 filed 19 Sep. 2009 (TNL A-2585P).

The phase clock processor 335 optionally uses the fixed widelane ambiguities 340 and/or MW biases 345 from widelane processor 325 together with the troposphere zenith delays 365 and the precise orbits 350 or IGU orbits 360 to estimate single-differenced clock errors and narrowlane ambiguities for each pairing of satellites. The single-differenced clock errors and narrowlane ambiguities are combined to obtain single-differenced phase-leveled clock errors 370 for each satellite (except for a reference satellite) which are single-differenced relative to the reference satellite. The low-rate code leveled clocks 360, the troposphere zenith delays 365 and the precise orbits 350 or IGU orbits 360 are used to estimate high-rate code-leveled clocks 375. Here, the computational effort is linear with the number of stations and to the third power with the number of satellites. The rapidly-changing phase-leveled clocks 370 and code-leveled clocks 375 are available, for example, with a delay of 0.1 sec-0.2 sec. The high-rate phase-leveled clocks 370 and the high-rate code-leveled clocks 375 are sent to the scheduler 355 together with the MW biases 340. Phase clock processor 340 is described in detail in Part 9 of U.S. Provisional Application for Patent No. 61/277,184 filed 19 Sep. 2009 (TNL A-2585P).

Scheduler 355 receives the orbits (precise orbits 350 or IGU orbits 360), the MW biases 340, the high-rate phase-leveled clocks 370 and the high-rate code-leveled clock 375. Scheduler 355 packs these together and forwards the packed orbits and clocks and biases 380 to a message encoder 385 which prepares a correction message 390 in compressed format for transmission to the rover. Transmission to a rover takes for example about 10 sec-20 sec over a satellite link, but can also be done using a mobile phone or a direct internet connection or other suitable communication link. Transmission to regional network processor 290 is also via a suitable communication link. Scheduler 355 and message encoder are described in detail in Part 10 of U.S. Provisional Application for Patent No. 61/277,184 filed 19 Sep. 2009 (TNT A-2585P).

Part 3: Regional Network Corrections

Figure 4:
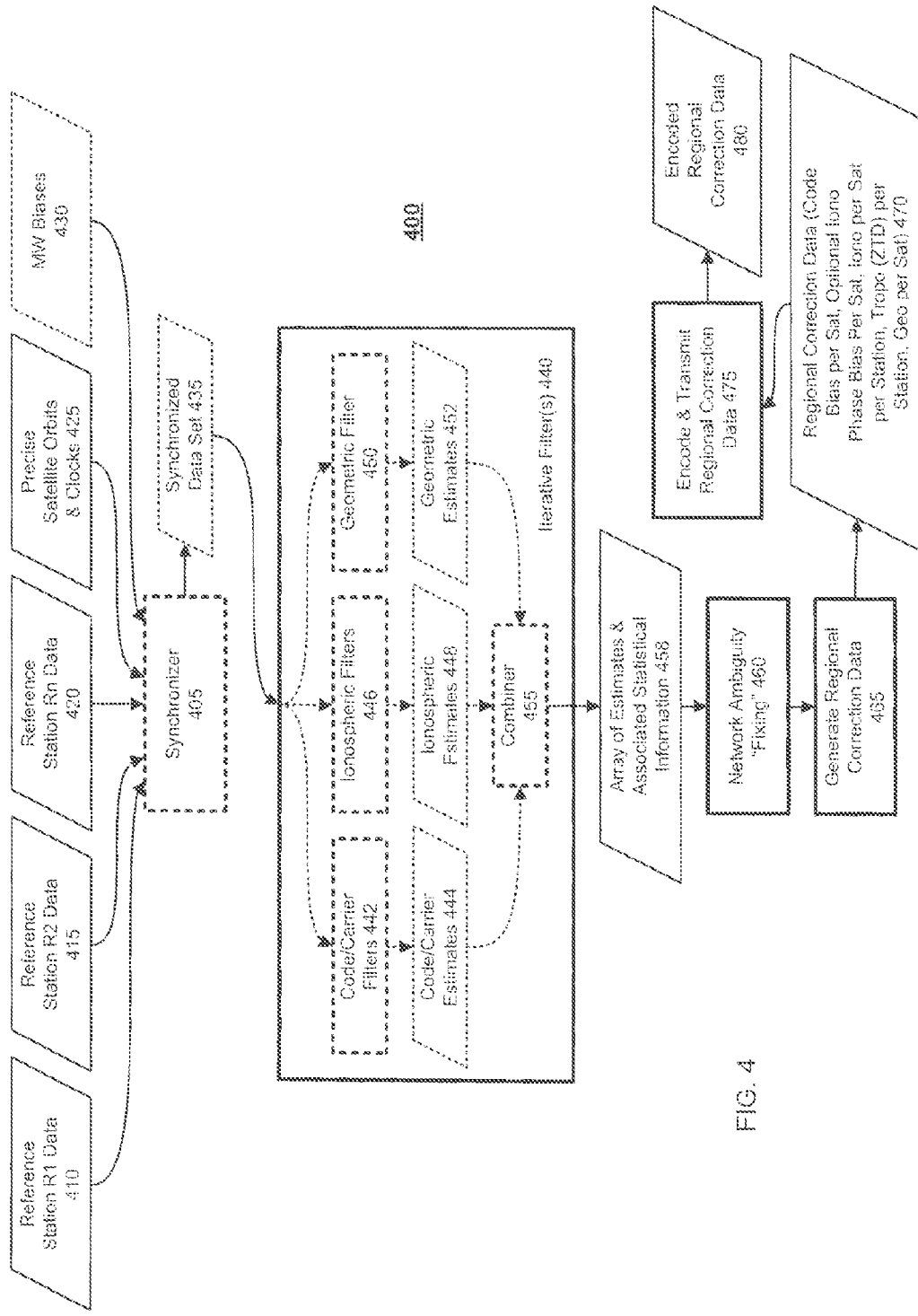

FIG. 4 schematically illustrates a regional network processor 400, such as regional network processor 290, its accordance with some embodiments of the invention. A data synchronizer 405 receives reference date from each reference station of the regional network, such as reference data 410, 415, . . . 420 from respective reference stations 280, 284, . . . 286. Synchronizer 405 also receives precise satellite orbits and clocks 425 from global network processor 300 or any other available source. Synchronizer 405 also optionally receives MW biases 430, such as MW biases 340 from global network processor 300; if MW biases are not supplied to regional network processor 400 from an external source, these are optionally estimated in regional network processor 400.

Observations are acquired epoch by epoch at each regional network reference station and transmitted with time tags to iterative filters(s) 440. For some stations the observations may arrive delayed. This delay can range between, milliseconds and minutes. Therefore the optional synchronizer 435 collects the regional network reference station data within a predefined lime spas and passes the observations for each epoch as a set to iterative filter(s) 440. This allows data arriving with a reasonable delay to be included the processing of an epoch of data. Iterative filter(s) 440 can be implemented using least squares, using a single Kalman filter or, for better computing efficiency, as factorized filters using techniques described in U.S. Pat. No. 7,432,853 (TNL A-1403), United States Patent Application Publication US 2009/0224969 A1 (TNL A-1743) and/or United States Patent Application Publication US 2009/0027264 A1 (TNL A-1789). If implemented as optional factorized filters, the synchronized data set 435 is supplied for example to one or more banks of code/carrier filters 442 which produce estimates for the code/carrier combinations and associated statistical information 444, to ionospheric filters 446 which produce estimates for the ionospheric combinations and associated statistical information 448, to a geometric filter 450 which produces an estimate for the geometric combination and associated statistical information 452, and the estimates are combined in a combiner 455. Quintessence filters (not shown) may optionally be used if the reference station data are obtained from GNSS signals having three or more carriers, as described in U.S. Pat. No. 7,432,853 (TNL A-1403).

The array of estimates and associated statistical information 458 from iterative filter(s) 440, which includes float-solution ambiguity values, is supplied to a "fixing" element 460. Some embodiments of "fixing" element 460 employ any suitable techniques known in the art, such as simple rounding, bootstrapping, integer least squares based on the Lambda method, or Best Integer Equivariant. See for example P. Teunissen et al.; *GNSS Carrier Phase Ambiguity Resolution: Challenges and Open Problems*, In M. G. Sideris (ed.); Observing our Changing Earth, International Association of Geodesy Symposia 133, Spinger Verlag Berlin-Heidelberg 2009 and Verhagen, Sandra, *The GNSS integer ambiguities: estimation and validation*, Publications on Geodesy 58, Delft, 2005. 194 pages, ISBN-13: 978 90 6132 290 0. ISBN-10: 90 6132 290 1. See also the discussion of ambiguity fixing in U.S. Pat. No. 7,432,853. The term "fixing" as used here is intended to include not only fixing of ambiguities to integer valises using techniques such as rounding, bootstrapping and Lambda search, but also to include forming a weighted average of integer candidates to preserve the integer nature of the ambiguities if not fixing them to integer values. The weighted average approach is described in detail in unpublished International Patent Applications PCT/US/2009/004471, PCT/US/2009/004472, PCT/US/2009/004473, PCT/US/2009/004474 and PCT/US/2009/004476 filed 5 Aug. 2009 (TNL A-2339PCT) and United States Provisional Application for Patent No. 61/189,382 filed 19 Aug. 2008 (TNL A-2339P).

A regional correction data generation element 465 prepares regional correction data 470 comprising, for example, at least one code bias per satellite, and at least one of an ionospheric delay per satellite at multiple regional network stations, an optional ionospheric phase bias per satellite, and non-ionospheric corrections. The non-ionospheric corrections comprise, for example, a tropospheric delay per regional network station and/or a geometric correction per satellite.

Figure 5:
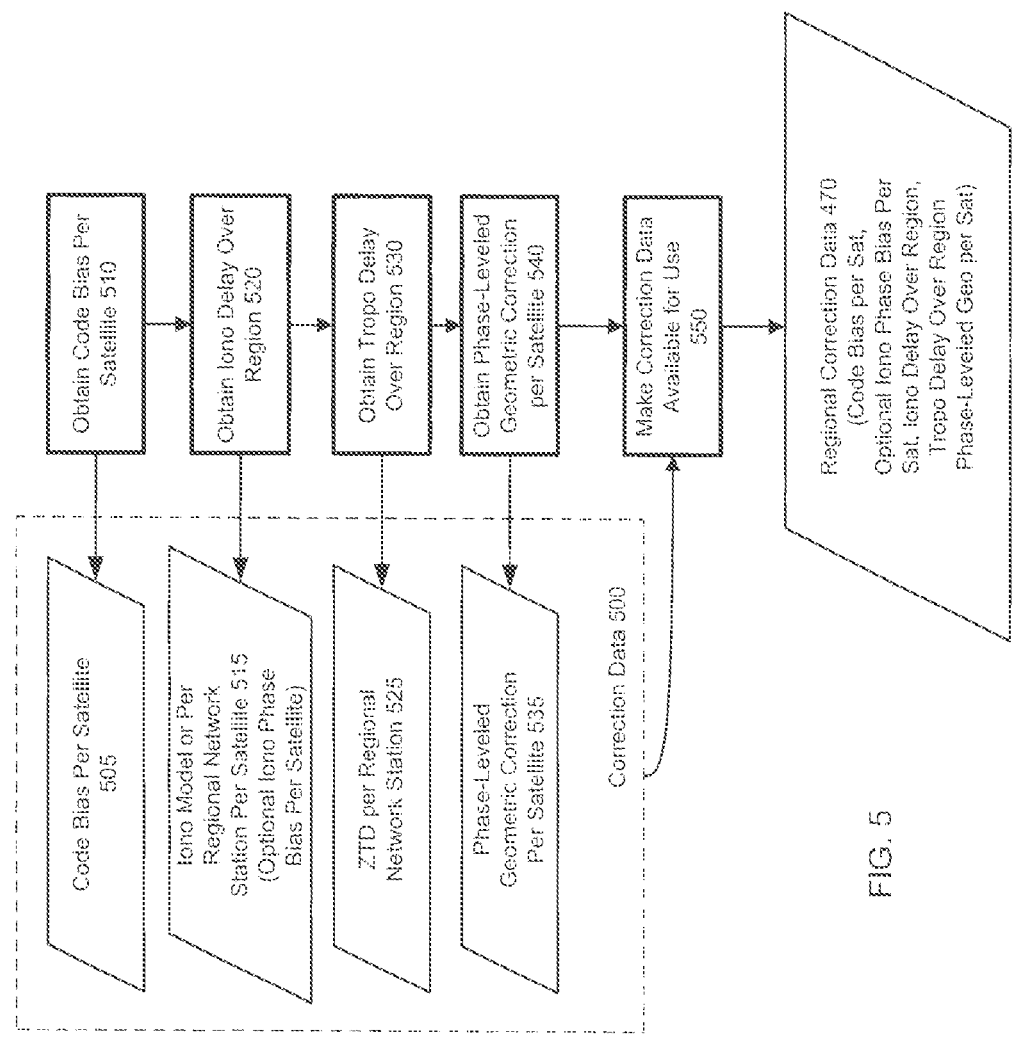

FIG. 5 schematically illustrates a regional network process 465 for generating the regional correction data 470 from correction data 500 in accordance with some embodiments of the invention. At least one code bias per satellite 505 is obtained at 510. The code bias per satellite can be determined in the global network processor, in the regional network processor, or in another processor. An ionospheric delay 515 ewer a region, which may be all or a part of the region of the regional network, is obtained at 520, and optionally an ionospheric phase bias per satellite. The ionospheric delay 515 may be determined from an ionospheric model or by estimating ionospheric delay per satellite per station. A tropospheric delay 525 over a region, which may be all or a part of the region of she regional network, is obtained at 530. The tropospheric delay 525 may be determined for example by estimating a zenith total delay (ZTD) per regional network station in the regional network processor. A phase-leveled geometric correction per satellite 535 is obtained at 540. The phase-leveled geometric correction per satellite is estimated, after fixing ambiguities, in the global network processor or in the regional network processor. Further details of the regional correction 470 data are explained below.

Part 3: Precise Navigation/Positioning With Regional Network Corrections

Figure 6:
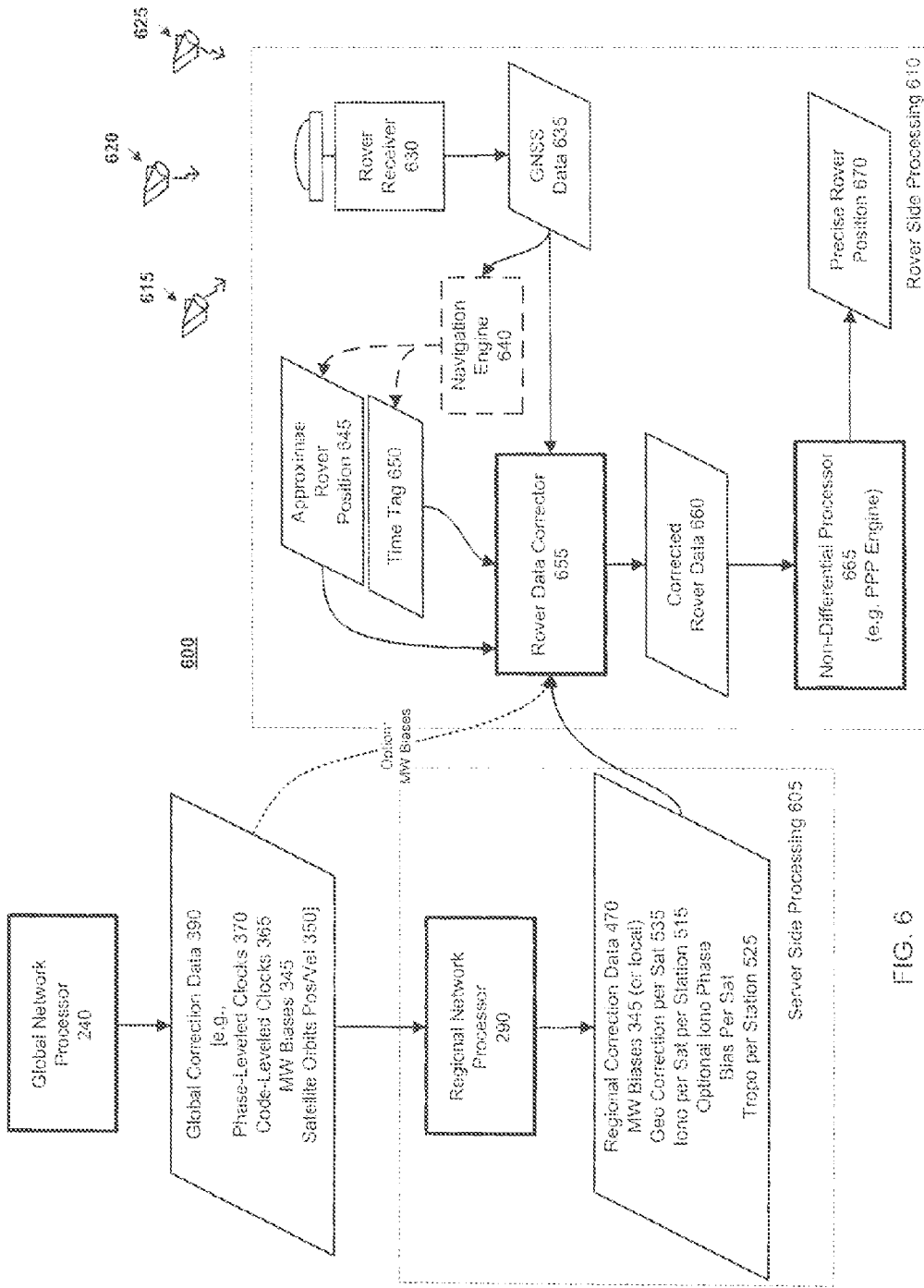

FIG. 6 schematically illustrates an augmented precise navigation/positioning scenario 600 in accordance with some embodiments of the invention. Global network processor 240 delivers global correction data 390 to regional network processor 290. Global correction data comprises, for example, phase-leveled clocks 370, code-leveled clocks 365, MW biases 345 and satellite orbit position and velocity information 350. Regional network processor 290 also receives data from regional network stations and generates regional correction data 470. Regional correction data comprises, for example, MW biases (MW biases 345 from global correction message 390 or MW biases estimated in regional network processor 290 or MW biases obtained from any other available source), a phase-leveled geometric correction per satellite 535 estimated in regional network processor 290, ionospheric delay per satellite per station, 515 and optionally an ionospheric phase bias per satellite, and tropospheric delay per station 525.

Regional correction data 470 from server side processing 605 is delivered, e.g., as encoded regional correction data 480, for use its rover side processing 610. GNSS signals from GNSS satellites 615, 620, 625 are observed by rover receiver 630 which provides GNSS observation data 635. An optional navigation engine 640 estimates a rough position of the antenna of rover receiver 630, typically without the use of corrections. This rough position, or an approximate position of rover receiver 630 known from another source, is used as an approximate rover position 645 in preparing regional corrections (e.g., 715), appropriate to the approximate position 645. A time tag 650 is associated with the approximate rover position 650. The GNSS observation data 635, approximate rover position 645 and time tag 650, and regional correction data 470 (with MW biases optionally coming directly from global correction data 390) are supplied to a rover data corrector 655. Rover data corrector 655 applies the regional correction data 470 with MW biases to the GNSS observation data 635 to obtain corrected rover data 660 for the approximate rover position 645 which corresponds in time with the GNSS data 635. A non-differential processor 665, such as a Precise Point Positioning (PPP) engine, estimates a precise rover position 670 from she corrected rover data 660.

While the rover data corrector 655 and non-differential processor 665 are shown in FIG. 6 as being located within the rover side processing 610, either or both of these may be located elsewhere, such as at server side processing 605. Such a configuration may be advantageous in situations where tire rover receiver has limited processing power and has two-way communication with a remotely-located computer having available processing capacity and/or in tracking applications (e.g., tracking location of mobile objects or persons carrying the rover receiver 630) where knowledge of the rover receiver's precise position is needed at a location remote from the rover receiver.

Figure 7:
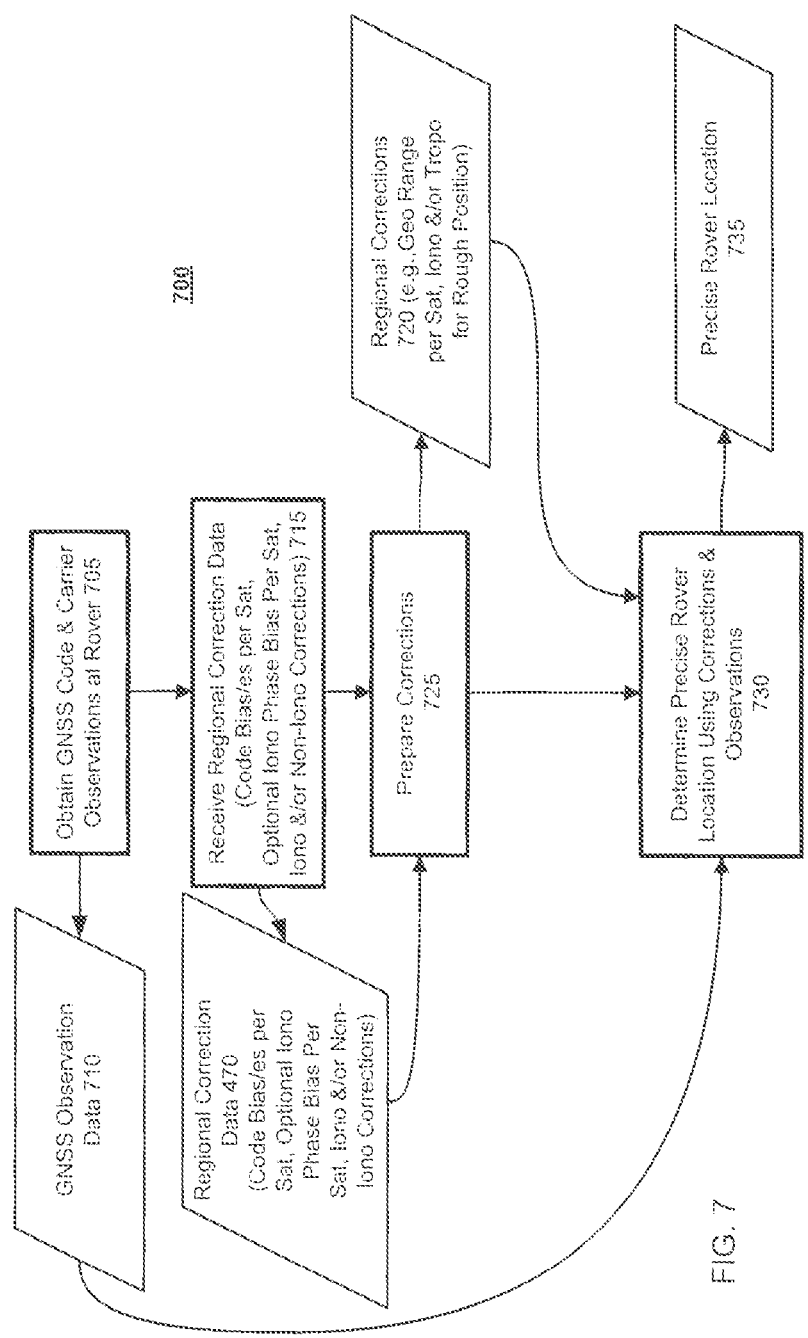

FIG. 7 schematically illustrates augmented precise navigation/positioning in accordance with some embodiments of the invention. GNSS data 710 (e.g., GNSS data 635) comprising code and carrier observations are obtained from the rover receiver at 705. Regional correction data 470 comprising one or more code biases per satellite, together with ionospheric corrections and/or non-ionospheric corrections and MW biases, are obtained at 710. Regional corrections 720 are prepared at 725. GNSS data 710 and regional corrections 720 are used at 730 to determine a precise rover location 735.

Figure 8:
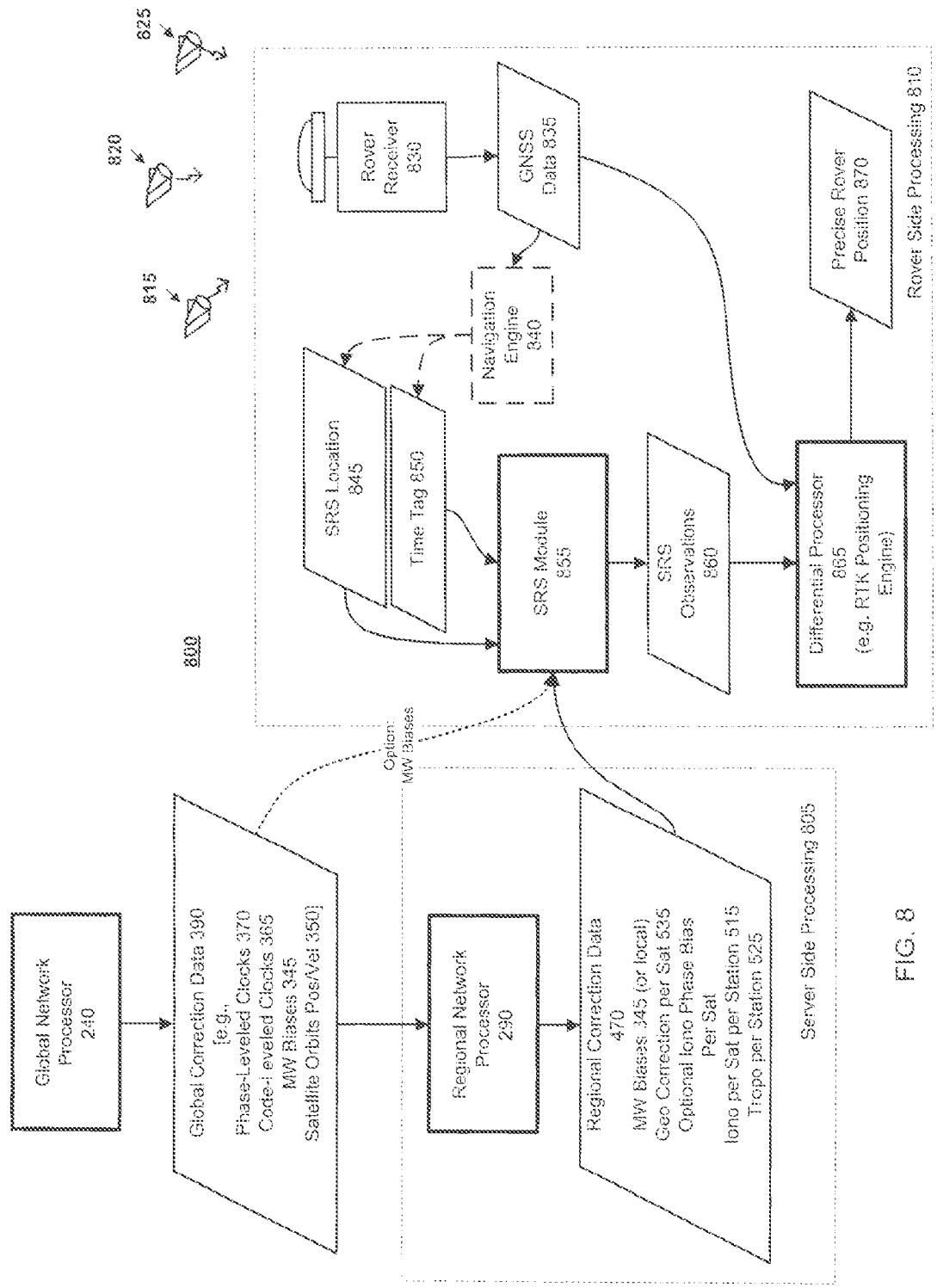

FIG. 8 schematically illustrates augmented precise navigation/positioning with differential processing in accordance with some embodiments of the invention. Global network processor 240 delivers global correction data 390 to regional network processor 290. Global correction data comprises, for example, phase-leveled clocks 370, code-leveled clocks 365, MW biases 345 and satellite orbit position and velocity information 350. Regional network processor 290 also receives data from regional network stations and generates regional collection data 470. Regional correction data comprises, for example, MW biases (MW biases 345 from global correction message 390 or MW biases estimated in regional network processor 290 or MW biases obtained from any other available source), a phase-leveled geometric correction per satellite 535 estimated in regional network processor 290, ionospheric delay per satellite per station 515, and optionally an ionospheric phase bias per satellite, and tropospheric delay per station 525.

Regional correction data 470 from server side processing 805 is delivered, e.g., as encoded regional correction data 480, for use in rover side processing 810. GNSS signals from GNSS satellites 815, 820, 825 are observed by rover receiver 830 which provides GNSS observation data 835. An optional navigation engine 840 estimates a rough position of the antenna of rover receiver 830, typically without the use of corrections. This rough position, or an approximate position of rover receiver 830 known from another source, is taken as a synthetic reference station (SRS) location 845. A time lag 850 is associated with SRS location 845. A synthetic reference station module 855 uses the current SRS location 845 and current regional correction data 470 to construct a set of synthetic reference station observations 860 for processing of each epoch of GNSS data 835 in a differential processor 865. Differential processor 865 is, for example, a conventional real time kinematic (RTK) positioning engine of a commercially available GNSS receiver. Differential processor uses the SRS observations 860 and the GNSS data 835 to determine a precise rover position 870, for example at each epoch of GNSS data 835.

In some embodiments the MW biases 345 from global network processor 240 are passed through the regional network processor 290 and provided to SRS module 855 as a part of regional correction data 470. In some embodiments the MW biases 345 from global network processor 240 are passed directly from global network processor 240 to SRS module 855 as a part of global correction data 390, e.g., if the rover has the capability to receive global correction data 390 in addition to regional correction data 480. In some embodiments the MW biases are estimated by the regional network processor 290 and provided to SRS module 855 as a part of regional correction date 470.

While the SRS module 855 and differential processor 865 are shown in FIG. 8 as being located within the rover side processing 810, either or both of these may be located elsewhere, such as at server side processing 805. Such a configuration may be advantageous in situations where the rover receiver has limited processing power and has two-way communication with a remotely-located computer having available processing capacity and/or as in tracking applications where knowledge of the rover receiver's position is needed at a location remote from the rover receiver.

Figure 9:
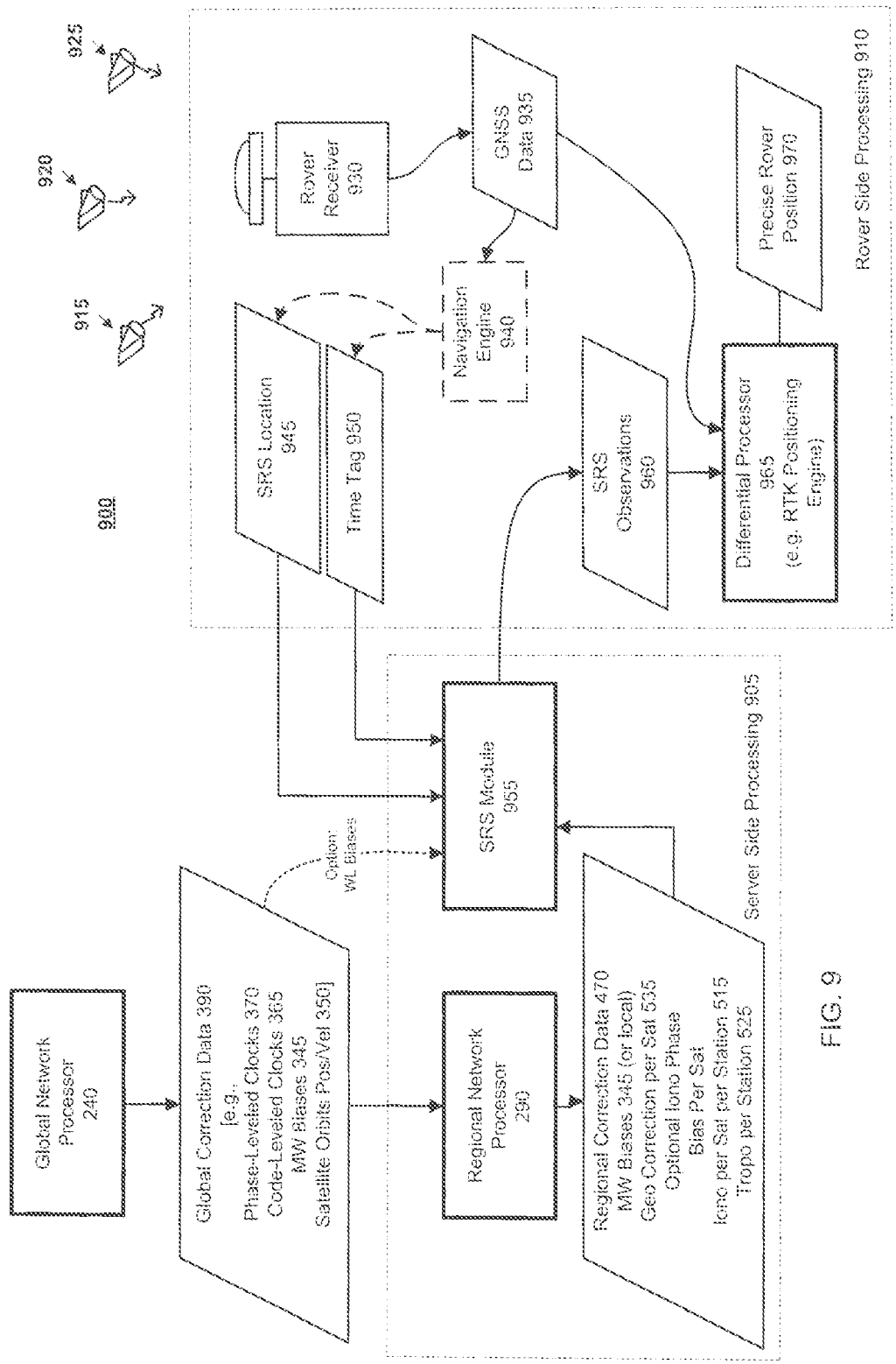

FIG. 9 schematically illustrates augmented precise navigation/positioning with differential processing in accordance with some embodiments of the invention. In this example the server side processing includes the SRS module. Global network processor 240 delivers global correction data 390 to regional network processor 290. Global correction data comprises, for example, phase-leveled clocks 370, code-leveled clocks 365, MW biases 345 and satellite orbit position and velocity information 350. Regional network processor 290 also receives date from regional network stations and generates regional correction data 470. Regional correction data comprises, for example, MW biases (MW biases 345 from global correction message 390 or MW biases estimated in regional network processor 290 or MW biases obtained from any other available source a phase-leveled geometric correction per satellite 535 estimated in regional network processor 290, ionospheric delay per satellite per station 515, and tropospheric delay per station 525.

GNSS signals from GNSS satellites 915, 920, 925 are observed by rover receiver 930 which provides GNSS observation data 935. An optional navigation engine 940 estimates a rough position of the antenna of rover receiver 930, typically without the use of corrections. This rough position, or art approximate position of rover receiver 930 known from another source, is taken as a synthetic reference station (SRS) location 945. A time tag 950 is associated with SRS location 945. Server side processing 905 includes an SRS module 955 which uses the current SRS location 945 and current regional correction data 470 to construct a set of synthetic reference station observations 960 for processing of each epoch of GNSS data 935 in a differential processor 965. Differential processor 865 is, for example, a conventional real time kinematic (RTK) positioning engine of a commercially available GNSS receiver. Differential processor uses the SRS observations 960 and the GNSS data 935 to determine a precise rover position 970, for example at each epoch of GNSS data 935.

Sources of an approximate position of rover receiver to use as SRS location 845 or 945 include, without limitation, (a) the autonomous position of the rover receiver as determined by navigation engine 840 or 940 using rover data 835, (b) a previous precise rover position such as a precise rover position determined for a prior epoch by differential processor 865 or 965, (c) a rover position determined by an inertial navigation system (INS) collocated with the rover, (d) the position of a mobile phone (cell) tower in proximity to a rover collocated with a mobile telephone communicating with the tower, (e) user input such as a location entered manually by a user for example with the aid of keyboard or other user input device, and (f) any other desired source.

Regardless of the source, some embodiments update the SRS location 845 or 945 from time to time. The SRS location 845 or 945 is updated, for example: (a) never, (b) for each epoch of rover data, (c) for each $n^{th}$ epoch of rover data, (d) after a predetermined time interval, (e) when the distance between the SRS location 845 or 945 and the approximate rover antenna position from navigation engine 840 or 940 exceeds a predetermined threshold, (f) when the distance between the approximate rover antenna position and the precise rover position exceeds a predetermined threshold, (g) for each update of the approximate rover antenna position, or (h) for each update of the precise rover antenna position 870 or 970. In some embodiments the SRS location 945 is not the same as the autonomous as the autonomous position solution, but somewhere close to it.

Figure 10:
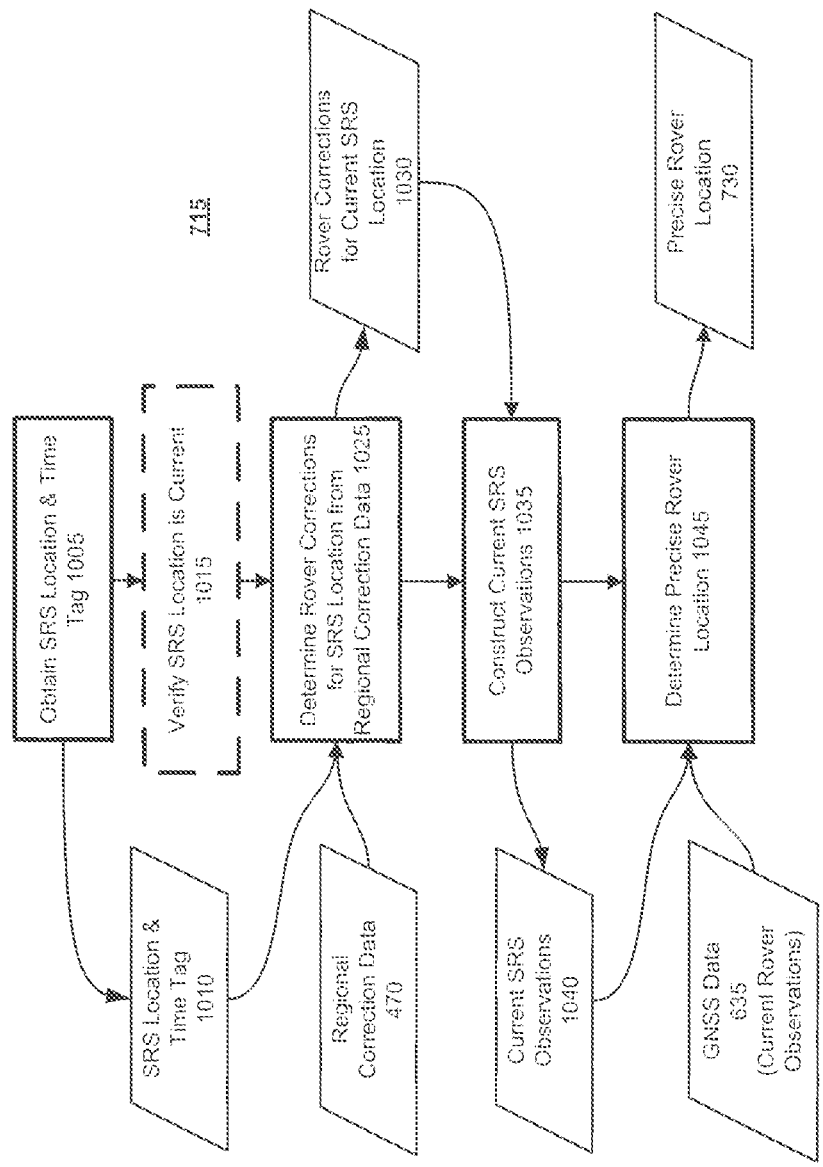

FIG. 10 schematically illustrates augmented precise navigation/positioning with differential processing accordance with some embodiments of the invention. At 1005 the SRS location and time tag information 1010 are obtained. At 1015 the SRS location is verified as current, for example by comparing its time tag with a time tag of the current epoch of rover observations to be processed. At 1025 the rover collections 1030 for the current SRS location are determined from the current SRS location and the regional correction data 470. At 1035 she current SRS observations 1040 are constructed from the rover corrections 1030. At 1045 the precise rover location 730 is determined by differential processing of the current SRS observations 1040 and the GNSS data 635.

Figure 11:
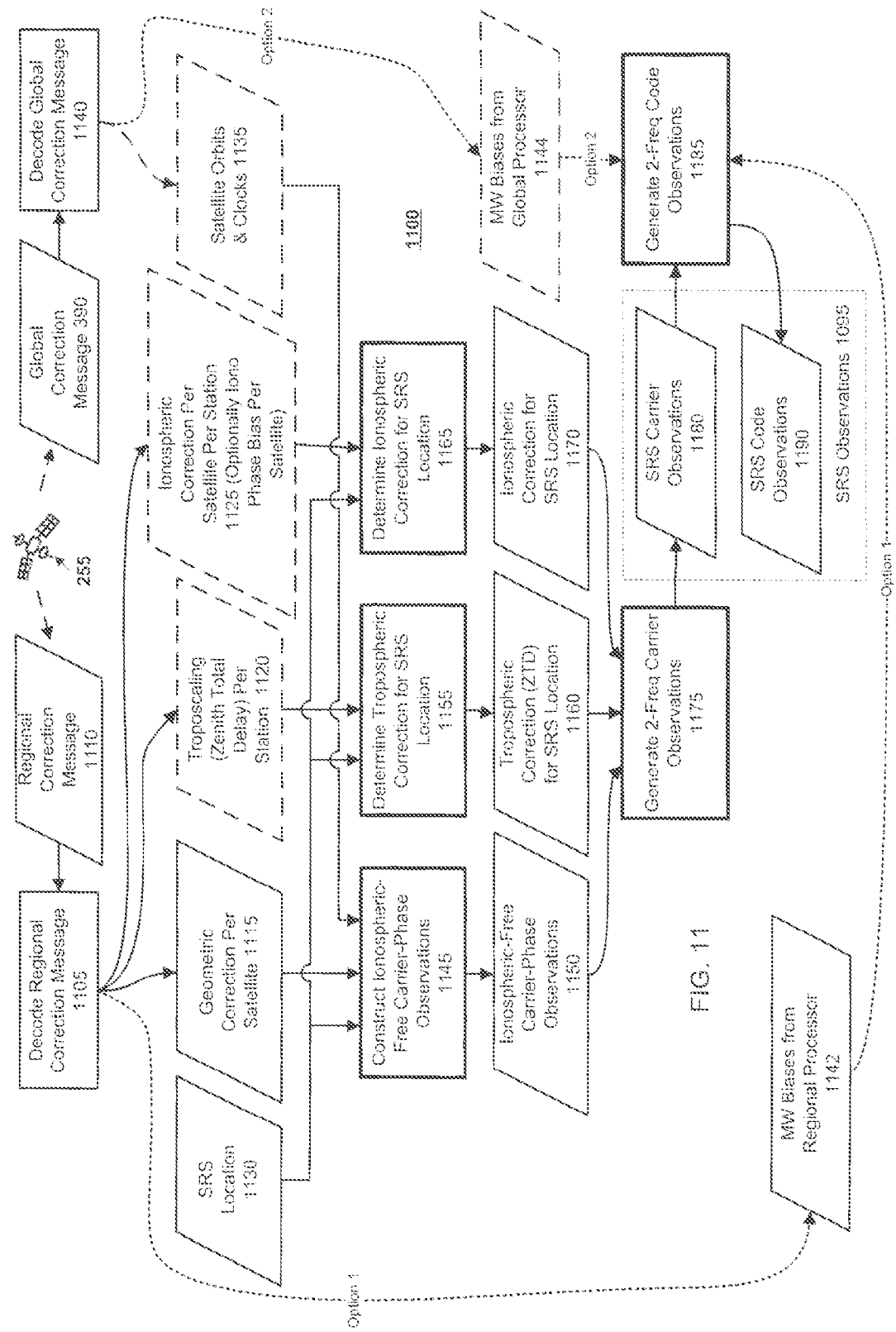

FIG. 11 schematically illustrates construction of synthetic reference station observations in accordance with some embodiments of the invention. At 1105 the regional correction message 1110 received from a transmission channel such as communications satellite 255 is decoded. The decoding unpacks regional correction data elements comprising a geometric correction (code bias) per satellite 1115, a troposcaling value (Zenith Total Delay) per station 1120 and an ionospheric correction per satellite per station, and optionally ionospheric phase bias per satellite 1125. An SRS location 1130 is obtained as described above. Satellite orbits and clocks 1110 are obtained from the broadcast GNSS satellite navigation message or precise satellite orbit and clock information is optionally retrieved at 1140 by decoding global correction message 390. MW biases 1142 are obtained from regional correction message 1110 via regional correction message decoding er 1105 or MW biases 1144 are obtained from global correction message 390 via global correction message decoder 1140.

A module 1145 constructs ionospheric-free phase observations 1150 for satellites in view at the SRS location using the SRS location information 1130 and the satellite orbits and clocks information 1135 to compute a range and the geometric correction per satellite 1115 to correct the computed range (Eq32). A module 1155 determines a tropospheric delay 1160 for the SRS location from the troposcaling per station 1120 (Eq. 36, Eq. 39. A module 1165 determines an ionospheric delay 1170 for the SRS location from the ionospheric correction per satellite per station data optionally ionospheric phase bias per satellite 1125 (Eq.36, Eq.39). At 1175 the SRS carrier-phase observations 1180 are constructed for two (or more) carrier frequencies by combining the ionospheric free-phase observations 1150 with the tropospheric correction 1160 for the SRS location and the ionospheric correction for the SRS location 1175 (Eq. 33,Eq.34). At 1185 the SRS code observations 1190 are constructed by combining the SRS carrier-phase observations 1180 with MW biases 1142 or MW biases 1144 (Eq. 25,Eq.26). The SRS carrier observations 1180 and SRS code observations 1190 comprise the SRS observations 1095 at each epoch.

Part 4: Correction for Atmospheric Effects

Figure 12:
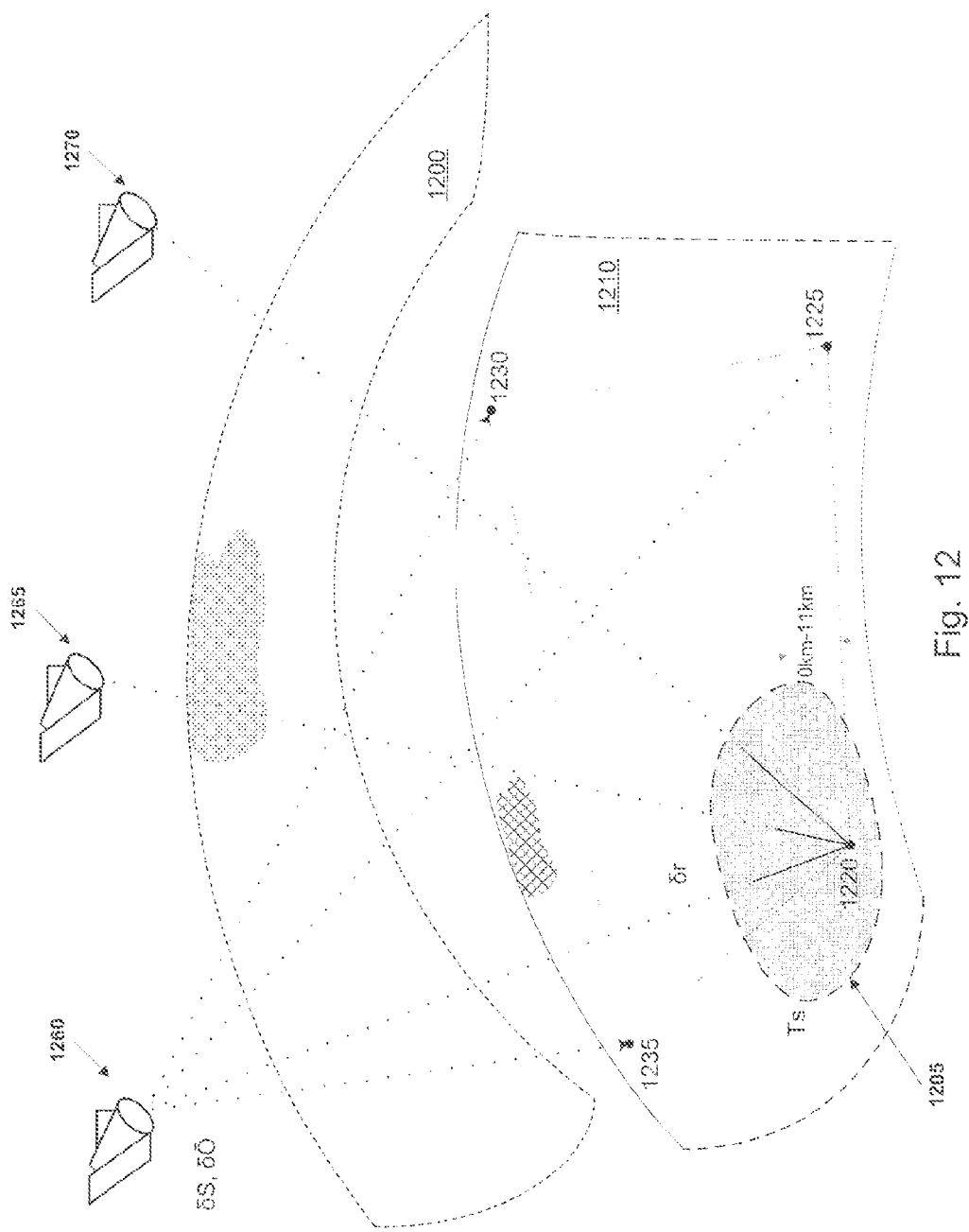

FIG. 12 schematically illustrates an ionospheric shell 1200 and a portion 1205 of a tropospheric shell surrounding the Earth 1210, with ground-based reference stations 1220, 1225, 1230, . . . 1235 of a network each receiving signals from GNSS satellites 1260, 1265, . . . 1270. For convenience of illustration, only the portion 1205 of the tropospheric shell surrounding reference station 1220 is shown. The troposphere has a depth of, for example zero to about 11 km. Tropospheric delay affects the signals received by each reference station in a manner depending on atmospheric temperature, pressure and humidity in the vicinity of the reference station, as well as the elevation of the satellite relative to the reference station. The error is about 1 mm per meter at ground level, such that the last meter of the signal path to the reference station gives about 1 mm of error in the tropospheric model.

Various techniques are known for modeling tropospheric path delay on the signals. See, for example, B. HOFMANN-WILLENHOF et al, GLOBAL POSITIONING SYSTEM: THEORY AND PRACTICE, 2d Ed., 1993, section 6.3.3, pp. 98-106. Tropospheric scaling (tropo-scaling) which lumps the atmospheric parameters into one tropo-scaling parameter can be implemented in at least three ways. A first approach is to model Zenith Total Delay (ZTD) representing tropospheric delay in a vertical direction relative to the reference station as a value representing range error δr, e.g., 2.58 meters. A second approach is to model the sum of one plus a scaling factor (1+S) such that tropospheric delay in the vertical direction T'=(1+S) T, where T is a constant, e.g., 1+S=1.0238. A more convenient approach is to model S directly, e.g., S=2.38%. For purposes of the present invention, it is sufficient to treat as "tropospheric effect" all that affects different signal frequencies in the same way (non-dispersive).

Figure 13:
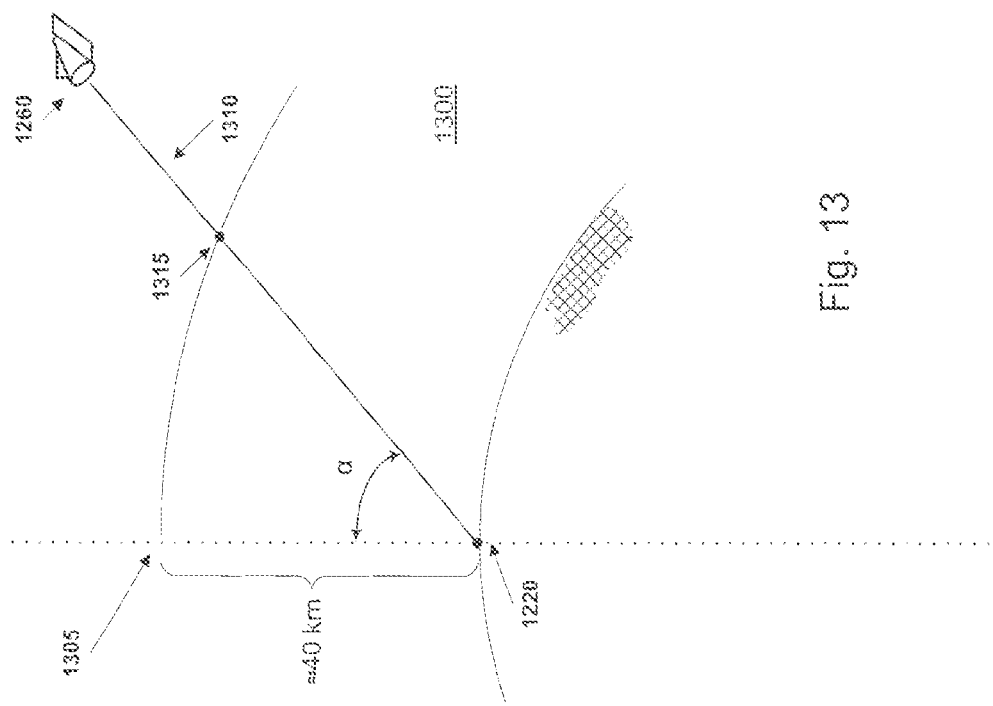
FIG. 13 illustrates a slanted ray path from a satellite to a receiver passing through the troposphere.

FIG. 13 illustrates a slanted ray path from a satellite to a receiver passing through the troposphere. Except when a satellite is directly over a reference station, signal rays penetrate the atmosphere in a slant path from satellite to receiver as shown in FIG. 13, such as a straight-line path 1310 from satellite 1260 to reference station 1220. The slant path of the signal ray from a given satellite to each reference station penetrates the troposphere at an angle α which is different for each satellite in view at the station. The tropospheric mapping function is tints different for each satellite-to-reference-station combination. The effect of the different slant angles can be compensated by relating the geometry-dependent zenith delay $T\alpha$ with a geometry-independent $T_{90}°$ (Vertical T) by a mapping function m(α): $T\alpha = m(\alpha)T_{90}°$.

Figure 14:
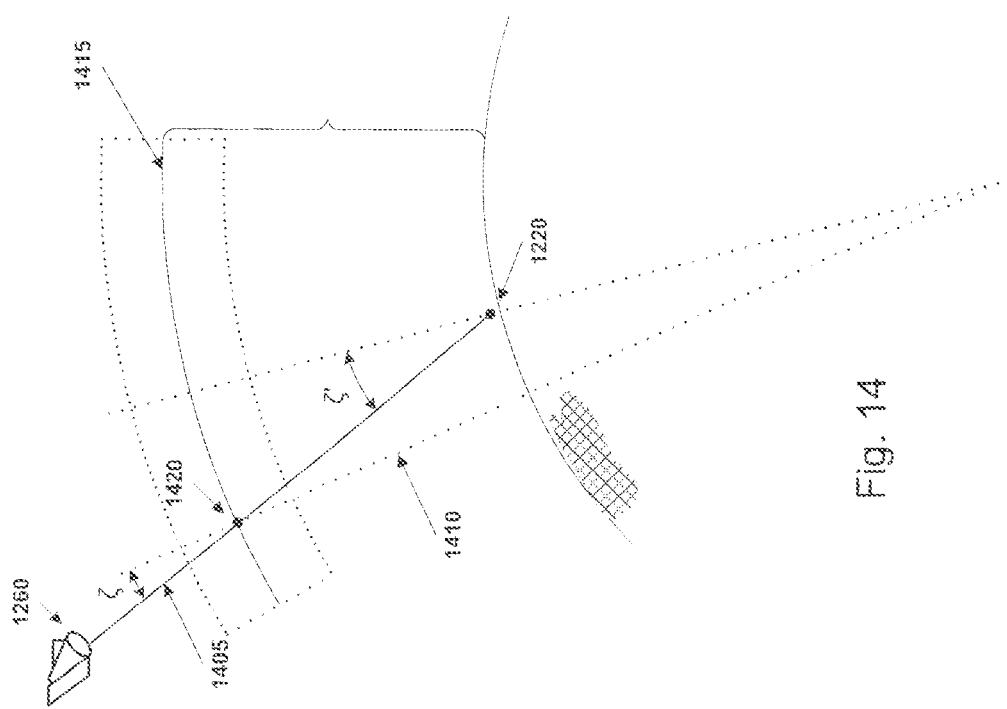
FIG. 14 illustrate the relation between Total Electron Content along a slant path and Vertical Total Election content.

Except when a satellite is directly over a reference station, signal rays penetrate the ionosphere in a slant path from satellite to receiver as shown in FIG. 14, such as straight-line path 1405 from satellite 1260 to reference station 1220. This slant path is explicitly accounted for by the so-called mapping function $f_{mapping}(\zeta) = 1/\cos(\zeta)$, where $\zeta$ is the angle of the signal ray with the line perpendicular to the ionospheric sphere through the piercepoint (e.g., line 1410). Since the slant path of the signal ray from a given satellite to each reference station penetrates the ionosphere at a different angle, the angle is different for each reference station. The mapping function is thus different for each satellite-to-reference-station combination. The effect of the different slant angles can be compensated by relating the geometry-dependent Total Electron Content (TEC) with a geometry-independent VTEC (Vertical TEC) by $TEC/f_{mapping}(\zeta) = TEC \cos(\zeta) = VTEC$. As shown for example in FIG. 14 with respect to reference station 1220 and satellite 1260, the TEC determined along slant path 1405 corresponds to the VTEC along the line 1410 perpendicular to the ionospheric sphere 1415 at piercepoint 1420.

With the relative coordinates that were introduced above and the concept of the mapping function, the ionospheric advance across the network area can be written as (here the uppercase i and j are to be understood as exponents, not indices)

$$I(\nabla \lambda, \nabla \varphi) = m(\Delta \lambda, \Delta \varphi)\left(\sum_{i,j=0}^{\infty} \alpha_{i,j} \Delta \lambda^i \Delta \varphi^j\right). \quad (40)$$

That is, the ionospheric advance across the network area is expressed in terms of its Taylor series (or any other set of orthogonal functions, such as spherical Bessel functions). For most purposes, and as illustrated here, the expansion can be stopped at first order, and the terminology $a_{1,0}=a_\lambda$ and $a_{0,1}=a_\varphi$ can be introduced. The expression $a_{0,0}=I_0$ is the ionospheric advance at the reference point, while $a_\lambda$ and $a_\varphi$ are the gradients in the ionosphere in the relative coordinates. The ionosphere at the piercepoints is therefore expressed as $$I_n^m = m_n^m(I_0^m + a_\lambda^m \Delta\lambda_n^m + a_\phi^m \Delta\phi_n^m). \quad (41)$$

Thus for each satellite m in view the parameters ($I_0^m$, $a_\lambda^m$, $a_\phi^m$) characterize the ionosphere across the network area. Those parameters are estimated, together with the carrier-phase Integer ambiguity and multipath states. Generally, if the expansion Eq. (39) is carried to k-th order, the number of states introduced for the ionosphere is (k+1)(k+2)/2. The other terms of Eq.(39) ($m_n^m$, $\Delta\lambda_n^m$, $\Delta\phi_n^m$) are given by the geometry of the network and the position of satellite m.

Figure 15:
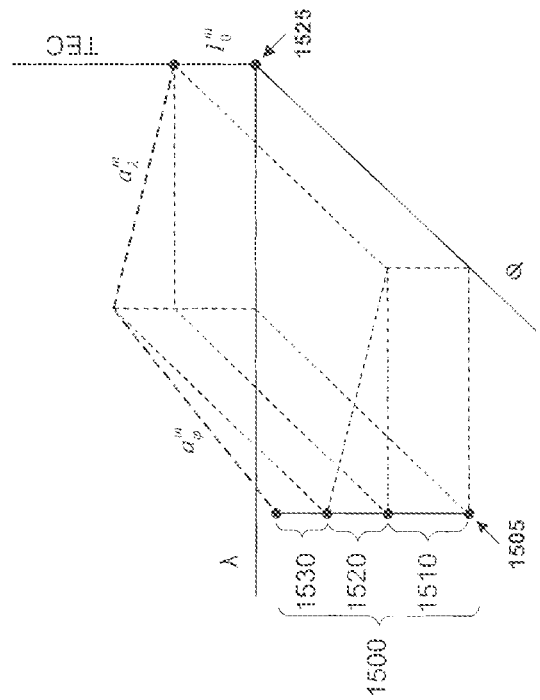
FIG. 15 illustrates how ionosphere parameters describe the ionosphere at a piercepoint relative to a reference point.

FIG. 15 illustrates how the ionosphere parameters ($I_0^m$, $a_\lambda^m$, $a_\phi^m$) describe the ionosphere at a piercepoint relative to a reference point. The ionosphere has a TEC of $I_0^m$ at the reference point, with a slope $a_\lambda^m$ in angular direction $\lambda$ and a slope $a_\phi^m$ in angular direction $\phi$. In the example of FIG. 15, the TEC 1500 at piercepoint 1505 is the sum of a contribution 1510 equal to $I_0^m$, a contribution 1520 based on slope $a_\lambda^m$ and she angular distance of piercepoint 1505 from reference pond 1525 in direction $\lambda$, and a contribution 1530 based on slope $a_\phi^m$ and the angular distance of piercepoint 1505 from reference point 1525 in direction $\phi$.

While a linear treatment of the ionosphere delivers excellent availability, reliability is increased with an even more realistic model which takes into account the thickness of the ionosphere. As is known (for example from D. BILITZA, *International Reference Ionosphere* 2000, RADIO SCIENCE 2 (36) 2001, 261), the electron density of the ionosphere has a certain profile $f(h)$ as a function of altitude h which peaks sharply at a height between 300-400 kilometers above ground. To calculate the electron content that a ray experiences from satellite m to station n one would calculate the integral $$I_n^m \propto \int_{(x^m, y^m, z^m)}^{(x_n, y_n, z_n)} ds f(h), \quad (41)$$

where s is the measure along the direct line of sight between station and satellite. Notice how for the simple shell model already considered, $f(h) = \Delta(h - h_0)$ (Dirac Delta distribution), this expression returns the previous mapping function as $$\left. \frac{ds}{ds} \right|_{h_0} = \frac{1}{\cos\varphi}.$$

Using suitable parameters for $f(h)$, the integral for all station-satellite pairs can be numerically computed at each epoch. For practical purposes an approximation in terms of a box profile is fully sufficient and delivers improvements over the shell model. It is further assumed that the gradients in the ionosphere do not depend on altitude. This assumption can easily be relaxed by adding further gradient states for different altitudes. That the finite thickness of the ionosphere is an important feature of the model can be understood by picturing the entry and exit point of the ray of a low elevation satellite, e.g., as shown in FIG. 8 of United States Patent Application Publication US 2009/0224969 A1. If the thickness of the ionospheric shell is 200 kilometers, the entry point and exit point might be separated by some 1000 kilometers. With typical gradients of $a_\lambda$, $a_\phi \sim 10^{-3}$ m/km, the contributions to the calculation of ionospheric advance differ greatly from entry point to exit point.

FIG. 16 schematically illustrates troposcaling.

FIG. 19 schematically illustrates ionospheric delay IPBS at a physical base station location FBS and ionospheric delay ISRS at a synthetic reference station location SRS.

Part 5: Message Encoding & Decoding

It will be recalled that an objective of making regional correction data 470 available for processing of rover observations is to enable reconstruction of regional network observations and/or construction of synthetic reference station observations based on the regional network observations. Some embodiments mitigate the bandwidth required and/or speed the rover processing by encoding the regional correction data, e.g., as at 475 in FIG. 4.

FIG. 20 schematically illustrates a correction message encoding scheme in accordance with some embodiments. Regional correction data 470 is divided into network elements 2005 which apply to the entire regional network of, for example 80 reference stations, and cluster elements 2010 which apply to subsets ("clusters") of for example, up to 16 reference stations of the regional network. The encoded regional correction data 480 is then segmented into a network message 2015 containing the network elements and a series of cluster messages 2020, 2025, 2030, . . . 2035 containing cluster elements of respective station clusters 1, 2, 3, . . . n.

The network elements 2003 include, for example, a time lag, a geometric correction per satellite, a location of an arbitrary point in the network, to which corrections are referenced, MW biases, and the number of cluster messages to follow in the epoch, and optionally an ionospheric phase bias per satellite. The cluster elements 2010 include, for example, a tropo scaling value per station, an ionospheric correction per station per satellite, and she station locations. Station height is not needed if corrections are referenced to a standard elevation which is known to a rover receiving the correction data. The station locations need not be physical station locations, but may instead be virtual station locations for which the corrections are estimated from the observations at physical reference stations of the regional network.

FIG. 21 schematically illustrates clusters of regional network stations: cluster 1 at 2105, cluster 2 at 2110, cluster 3 at 2115, cluster 4 at 2120. Each cluster in this simplified example has four stations, though the number of stations is a matter of design choice. Cluster 1 has stations 1-1, 1-2, 1-3 and 1-4; cluster 2 has stations 12-1, 2-2, 2-3 and 2-4; cluster 3 has stations 3-1, 3-2, 3-3 and 3-4; and cluster 4 has stations 4-1, 4-2, 4-3 and 4-4. The cluster elements of clusters 1, 2, 3 and 4 are used respectively to construct cluster message 2125, 2130, 2135 and 2140.

In some embodiments, a regional correction message epoch has one network message 2105 billowed by a series of cluster messages 2020-2035, the number and sequence of which may vary from epoch to epoch. In some embodiments, each correction message epoch has a network message and a subset of cluster messages, with the clusters in the subset rotating over a series of epochs. In some embodiments, the order of clusters in the correction message epoch is based on an expected or estimated or known number of rovers physically located in the cluster. For example:

| Network Message | Cluster 1 Message | Cluster 2 Message | - - - | Cluster n Message |
|---|---|---|---|---|

A rover does not need all the cluster messages to construct a synthetic reference station correction for its approximate location, FIG. 22 shows an example in which a rover 2205 is located within a regional network having clusters 2210, 2220, 2230 and 2240, each having a respective network station (or virtual network station) 2215, 2225, 2235, 2245. Rover 2205 is surrounded by network stations 2215, 2225 and 2235 which are well distributed around it and within a suitable radius for preparing corrections for the rover's location from their observations (or virtual observations). The observations of network station 2245 are not needed by rover 2205 at its current location. If the rover moves for example well into cluster 2210 where it no longer needs cluster elements from clusters 2220 or 2230, the rover can use the cluster elements only from cluster 2210.

In some embodiments, rover 2205 uses the location information of the network message to construct a list of clusters, compares its approximate current location with the list to determine which cluster messages are needed to construct synthetic reference station corrections appropriate to its current location, and retrieves the cluster elements from the corresponding cluster messages. This approach can save memory, processor time, and other resources when processing rover observations to determine the precise rover location.

As discussed above with reference to Eq. (30), Eq. (31) and Eq. (32), the geometric correction term can be transmitted for three arbitrary locations in the network. Alternatively, the geometric correction term can be transmitted for a single arbitrary location in the network, along with the delta (difference from this term) for each of two other arbitrary locations in the network. From these geometric correction terms (or geometric correction term plus deltas), the rover constructs a linear model to estimate the geometric correction applicable to its approximate location.

FIG. 17 shows for example three arbitrary locations 1705, 1710, 1715 for which the geometric correction terms are determined in the network processor. Spacing between the three arbitrary locations should be large enough (e.g., 5 degrees of latitude and 5 degrees of longitude) and with good geometry to minimize error when building a linear model for a rover location 1720 within the network. FIG. 18 schematically illustrates a linear model for determining the geometric correction 1820 at rover location 1720 from the geometric corrections 1805, 1810, 1815 for a given satellite at respective arbitrary locations 1705, 1710, 1715. This approach helps to minimize bandwidth by reducing the number of geometric correction values needed to construct the corrections needed at the rover.

In some embodiments the regional network processing is carried out independently by multiple regional network processors to provide redundancy. Operating the regional network processors independent (and possibly with non-Identical sets of network station observations) means that biases and scalings may differ from between regional network processors. In some embodiments a network message includes a processor identifier so that the rover will know to react appropriately if its source of network messages changes, e.g., by resetting its filters to avoid using incompatible biases and scalings. Some embodiments include a cycle slip indicator to signal the rover that a cycle slip has occurred on a satellite in the regional network processing, so that the rover can reset the ambiguity values in its filters. To further save transmission bandwidth, some embodiments use an optional ionospheric correction general model from which the cluster message gives delta (difference) values; the rover uses the optional model from the network message with the difference values from the cluster message(s) to construct the ionospheric correction for the rover's approximate location, e.g., for the SRS location.

Some embodiments have a network correction message structured as follows:

| # of items | description |
|---|---|
| 1 | processor id |
| 3 (or 1 + 3) | 3 arbitrary locations (lat, long), [or 1 arbitrary location on plus delta to other two locations] |
| 3 | 1 geometric correction per satellite for each of 3 arbitrary locations |
| 3 (optional) | optional iono correction general model from which cluster message gives deltas |
| 1 | cycle slip indicator (CTC) |

Some embodiments have cluster messages structured as follows (for n satellites and with m stations per cluster):

| # of items | description |
|---|---|
| 1 | time tag |
| m | station position (B, L) (lat, lon) |
| m | tropo scaling |
| m × n | iono correction |
| m | site iono bias |

Part 6: Receiver and Processing Apparatus

FIG. 23 is a schematic diagram of a computer system in accordance wish some embodiments of the invention. Computer system 2320 includes one or more processors 2330, one or more data storage elements 2335, program code 2340 with instructions for controlling the processor(s) 2330, and user input/output devices 2445 which may include one or more output devices 2350 such as a display or speaker or printer and one or more devices 2355 for receiving user input such as a keyboard or touch pad or mouse or microphone.

FIG. 24 is a block diagram of a typical integrated GNSS receiver system 2400 with GNSS antenna 2405 and communications antenna 2410. The Trimble R8 GNSS System is an example of such a system. Receiver system 2400 can serve as a rover or base station or reference station. Receiver system 2400 includes a GNSS receiver 2415, a computer system 2420 and one or more communications links 2425. Computer system 2420 includes one or more processors 2430, one or more data storage elements 2435, program code 2440 with instructions for controlling the processor(s) 2430, and user input/output devices 2445 which may include one or more output devices 2450 such as a display or speaker or printer and one or more devices 2455 for receiving user input such as a keyboard or touch pad or mouse or microphone.

Part 7: General Remarks

The incentive concepts can be employed in a wide variety of processes and equipment. Some exemplary embodiments wilt now be described. It will be understood that these are intended to illustrate rather than to limit the scope of the invention.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure. For example, while a minimum-error combination is employed in the examples, those of skill in the art will recognized that many combinations are possible and that a combination other than a minimum-error combination can produce acceptable if less than optimum results; thus the claims are not intended to be limited to minimum-error combinations other than where expressly called for. Reference is made in detail to implementations of the present invention as illustrated in the accompanying drawings. The same reference indicators are used throughout the drawings and the following detailed description to refer to the same or like parts.

In the interest of clarity, not all of the routine features of the implementations described herein are shown and described. It wilt be appreciated that in the development of any such actual implementation, numerous implementation-specific decisions must be made to achieve the developer's specific goats, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (PPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an OS such as Microsoft® Windows® XP and Windows® 2000, available from Microsoft Corporation of Redmond, Wash., or Solaris® available from Sun Microsystems, Inc. of Santa Clara, Calif., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such, a computer system or computing environment may be networked locally, or over the Internet.

Part 8: Summary of Inventive Concepts

In addition to the foregoing, embodiments in accordance with the invention may comprise, for example, one or more of the following:

Part 8, A: Regional Augmentation Network

Methods

1. A method of processing GNSS data derived from observations at multiple stations, located within a region, of GNSS signals of multiple satellites over multiple epochs, wherein the GNSS signals have at least two carrier frequencies and the observations include code observations and carrier-phase observations, comprising:
   a. obtaining at least one code bias per satellite;
   b. obtaining an ionospheric delay over the region;
   c. obtaining a tropospheric delay over the region;
   d. obtaining a phase-leveled geometric correction per satellite; and
   e. making available correction data for use by a rover located within the region, the correction data comprising: the ionospheric delay over the region, the tropospheric delay over the region, the phase-leveled geometric correction per satellite, and the at least one code bias per satellite,
2. The method of 1, wherein obtaining at: least one code bias per satellite comprises obtaining art estimated code bias per satellite from a global network processor,
3. The method of 1, wherein obtaining at least one code bias per satellite comprises operating a processor to estimate a code bias per satellite from GNSS observations of reference stations of a regional network.
4. The method of 3, wherein operating a processor to estimate a code bias comprises operating a processor to fix a set of ambiguities and to estimate at least one code bias per satellite which is consistent with integer carrier-phase ambiguities.
5. The method of 4, wherein the code bias comprises a MW bias which is consistent with integer carrier ambiguities
6. The method of one of 4-5, wherein the set of ambiguities comprises at least one of: (i) widelane ambiguities and (ii) L1 and L2 ambiguities, (iii) L2E and L2C ambiguities, and (iv) a combination of carrier-phase ambiguities from which widelane ambiguities can be determined.
7. The method of one of 1-6, wherein obtaining art ionospheric delay over the region comprises operating a processor to determine the ionospheric delay over the region from a model.
8. The method of one of 1-6, wherein obtaining an ionospheric delay over the region comprises operating a processor to estimate from the observations an ionospheric delay per station per satellite.
9. The method of one of 1-6, wherein obtaining an ionospheric delay over the region comprises operating a processor to estimate from the observations an ionospheric delay per station per satellite and an ionospheric phase bias per satellite.
10. The method of one of 1-9, wherein obtaining a tropospheric delay over the region comprises operating a processor to estimate from the observations a tropospheric delay per station.
11. The method of 10, wherein the tropospheric delay per station comprises a zenith total delay per station.
12. The method of one of 1-11, wherein obtaining a phase-leveled geometric correction per satellite comprises operating a processor to estimate a set of ambiguities for satellites observed by the stations.
13. The method of one of 1-12, wherein obtaining a phase-leveled geometric correction per satellite comprises operating a processor to estimate a geometric correction which preserves integer nature of carrier-phase ambiguities.

14. The method of one of 1-13, wherein the phase-leveled geometric correction includes an integer-cycle bias per satellite.
15. The method of one of 1-14, wherein the correction data comprises at least one of (i) an ionospheric delay per station per satellite, (ii) an ionospheric delay per station per satellite and an ionospheric phase bias per satellite, and (iii) a tropospheric delay per station.
16. The method of one of 1-15, wherein the phase-leveled geometric correction per satellite comprises a geometric correction term for each of three locations within the region from which a geometric correction at an arbitrary location within the region can be determined.

Computer Program Product

17. A computer program product comprising: a computer usable medium having computer readable instructions physically embodied therein, the computer readable Instructions when executed by a processor enabling the processor to perform she method of one of 1-16.
18. A computer program comprising a set of instructions which when loaded in and executed by a processor enable the processor to perform she method of one of 1-16.

Apparatus

19. Apparatus for processing GNSS data derived from observations at multiple stations, located within a region, of GNSS signals of multiple satellites over multiple epochs, wherein the GNSS signals have at least two carrier frequencies and the observations include code observations and carrier-phase observations, comprising:
    a. at least one processor configured to obtain at least one code bias per satellite, an ionospheric delay over the region, a tropospheric delay over the region, and a phase-leveled geometric correction per satellite; and
    b. a communication channel to make available correction data for use by a rover located within the region, the correction data comprising: the ionospheric delay over the region, the tropospheric delay over the region, the phase-leveled geometric correction per satellite, and the at least one code bias per satellite.
20. The apparatus of 19, wherein the at least one processor obtains the at least one code bias per satellite from a global network processor.
21. The apparatus of 19, wherein the at least one processor is operative to estimate a code bias per satellite from GNSS observations of reference stations of a regional network.
22. The apparatus of 21, wherein the at least one processor is operative to fix a set of ambiguities and to estimate at least one code bias per satellite which is consistent with integer carrier-phase ambiguities.
23. The apparatus of 22, wherein the code bias comprises a MW bias which is consistent with integer carrier ambiguities
24. The apparatus of one of 22-23, wherein the set of ambiguities comprises at least one of: (i) widelane ambiguities and (ii) L1 and L2 ambiguities, (iii) L2E and L2C ambiguities, and (iv) a combination of carrier-phase ambiguities from which widelane ambiguities can be determined.
25. The apparatus of one of 19-24, wherein the at least one processor is operative to determine the ionospheric delay over the region from a model.
26. The apparatus of one of 19-25, wherein the at least one processor is operative to estimate from the observations art ionospheric delay per station per satellite,
27. The apparatus of one of 19-25, wherein the at least one processor is operative to estimate from the observations art ionospheric delay per station per satellite and an ionospheric phase bias per satellite.
28. The apparatus of one of 19-27, wherein the at least one processor is operative to estimate from the observations a tropospheric delay per station.
29. The apparatus of 28, wherein the tropospheric delay per station comprises a zenith total delay per station.
30. The apparatus of one of 19-29, wherein the at least one processor is operative to estimate a set of ambiguities for satellites observed by the stations.
31. The apparatus of one of 19-30, wherein the at least one processor is operative to estimate a geometric correction which preserves integer nature of carrier-phase ambiguities.
32. The apparatus of one of 19-31, wherein the phase-leveled geometric correction includes an integer-cycle bias per satellite.
33. The apparatus of one of 19-32, wherein the correction data comprises at least one of (i) an ionospheric delay per station per satellite, and (ii) a tropospheric delay per station.
34. The apparatus of one of 19-33, wherein the phase-leveled geometric correction per satellite comprises a geometric correction term for each of three locations within the region from which a geometric correction at an arbitrary location within she region can be determined.

Past 8.B: Rover Positioning with Regional Augmentation

Methods

1. A method of determining a precise position of a rover located within a region, comprising:
    a. operating a receiver to obtain rover observations comprising code observations and carrier-phase observations of GNSS signals on at least two carrier frequencies,
    b. receiving correction data comprising
        at least one code bias per satellite,
        at least one of: ii) a fixed-nature MW bias per satellite and (ii) values from which a fixed-nature MW bias per satellite is derivable, and at least one of: (iii) an ionospheric delay per satellite for each of multiple regional network stations, and (iv) non-ionospheric corrections;
    c. creating rover corrections from the correction data;
    d. operating a processor to determine a precise rover position using the rover observations and the rover corrections.
2. The method of one of 1, wherein the code bias per satellite comprises a code bias per satellite estimated by a global network processor,
3. The method of one of 1-2, wherein the ionospheric delay per satellite comprises an ionospheric delay estimated from observations of multiple regional network stations.
4. The method of one of 1-2, wherein the ionospheric delay per satellite is estimated from a model of ionospheric delay over the region.

5. The method of 1, wherein the correction data further comprises an ionospheric phase bias per satellite.
6. The method of one of 1-5, wherein the non-ionospheric corrections comprise a tropospheric delay for each of multiple regional network stations.
7. The method of one of 1-6, wherein the non-ionospheric corrections comprise a geometric correction per satellite.
8. The method of one of 1-7, wherein the non-ionospheric corrections comprise, for each satellite in view at the receiver, a geometric correction representing satellite position error and satellite clock error.
9. The method of 8, wherein creating rover corrections from the data set comprises identifying each geometric correction with a respective satellite observed at the rover.
10. The method of one of 8-9, wherein using the rover observations and the rover corrections to determine a precise rover position comprises: determining a geometric range per satellite using at least one of (i) broadcast ephemeris and (ii) precise ephemeris and, for each satellite, applying the geometric correction to the geometric range to obtain a corrected geometric range per satellite.
11. The method of one of 1-10, wherein the non-ionospheric corrections comprise, for each satellite in view at the rover, a geometric correction for each of three locations in the regions, and wherein creating rover corrections from the correction data comprises, for each satellite in view at the rover, determining a geometric correction for an approximate rover location from the geometric corrections for the three locations.
12. The method of one of 1-11, wherein the correction data comprises an ionospheric delay per satellite at multiple regional network stations, and wherein creating rover collections from the data set comprises interpolating an ionospheric delay for the rough position.
13. The method of one of 1-11, wherein the correction data comprises an ionospheric delay per satellite at multiple regional network stations and an ionospheric phase bias per satellite, and wherein creating rover corrections from the data set comprises, for each satellite, interpolating an absolute ionospheric delay for tire rough position and combining with the ionospheric phase bias.
14. The method of one of 1-13, wherein the data set comprises a tropospheric delay per satellite at multiple regional network stations, and wherein creating rover corrections from the data set comprises interpolating a tropospheric delay for the rough position.
15. The method of one of 1-14 wherein using the rover observations and the rover corrections to determine a precise rover position comprises: combining the rover corrections with the rover observations to obtain corrected rover observations, and determining the precise rover position from the corrected rover observations.
16. The method of one of 1-14, wherein using the rover observations and the rover corrections to determine a precise rover position comprises:
   a. using the rover corrections to estimate simulated reference station observables for each of multiple satellites in view at a selected location;
   b. differentially processing the rover observations with the simulated reference station observables to obtain the precise rover position.
17. The method of 16, wherein using the rover corrections to estimate simulated reference station observables for each of multiple satellites in view at a selected location comprises using the rover corrections to estimate at least one simulated reference station carrier-phase observation for each of multiple satellites observable at a selected location.
18. The method of one of 16-17, wherein using the rover corrections to estimate simulated reference station observables for each of multiple satellites in view at a selected location comprises using the rover corrections to estimate at least one simulated reference station code observation for each of multiple satellites observable at the selected location.
19. The method of one of 16-18, wherein the selected location is one of (i) the rough position of the rover and (ii) a location within 100 m of the rough position of the rover.
20. The method of one of 16-19, wherein using the rover corrections to estimate simulated reference station observables for each of multiple satellites in view at a selected location is performed in a processor at a location remote from the rover.
21. The method of one of 16-19, wherein using the rover corrections to estimate simulated reference station observables for each of multiple satellites in view at a selected location is performed in a processor at the rover.

Computer Program Product

22. A computer program product comprising: a computer usable medium having computer readable instructions physically embodied therein, the computer readable instructions when executed by a processor enabling the processor to perform she method of one of 1-21.
23. A computer program comprising a set of instructions which when loaded in and executed by a processor enable the processor to perform she method of one of 1-21.

Apparatus

24. Apparatus for determining a precise position of a rover located within a region, comprising:
   a. a receiver operative to obtain rover observations comprising code observations and carrier-phase observations of GNSS signals on at least two carrier frequencies,
   b. a correction data receiver operative to receive correction data comprising at least one code bias per satellite,
      at least one of: (i) a fixed-nature MW bias per satellite and (ii) values from which a fixed-nature MW bias per satellite is derivable, and
      at least one of: (iii) an ionospheric delay per satellite for each of multiple regional network stations, and (iv) non-ionospheric corrections; and
   c. at least one processor operative to create rover corrections from the correction data and operative to determine a precise rover position using the rover observations and the rover corrections.
25. The apparatus of 24, wherein the code bias per satellite comprises a code bias per satellite estimated by a global network processor.
26. The apparatus of one of 24-25, wherein the ionospheric delay per satellite comprises an ionospheric delay estimated from observations of multiple regional network stations.

27. The apparatus of one of 24-25, wherein the ionospheric delay per satellite is estimated from a model of ionospheric delay over the region.
28. The apparatus of 24, wherein the correction data further comprises an ionospheric phase bias per satellite.
29. The apparatus of one of 24-28, wherein the non-ionospheric corrections comprise a tropospheric delay for each of multiple regional network stations.
30. The apparatus of one of 24-29, whereat the non-ionospheric corrections comprise a geometric correction per satellite.
31. The apparatus of one of 24-30, wherein the non-ionospheric corrections comprise, for each satellite in view at the receiver, a geometric correction representing satellite position error and satellite clock error.
32. The apparatus of 31, wherein said at least one processor is operative to identify each geometric correction with a respective satellite observed at the rover.
33. The apparatus of one of 31-32, wherein said at least one processor is operative to determine a geometric range per satellite using at least one of (i) broadcast ephemeris and (ii) precise ephemeris and, for each satellite, and to apply the geometric correction to the geometric range to obtain a corrected geometric range per satellite.
34. The apparatus of one of 24-33, wherein the non-ionospheric corrections comprise, for each satellite in view at the rover, a geometric correction for each of three locations in the regions, and wherein the at least one processor is operative to determine, for each satellite in view at the rover, a geometric correction for an approximate rover location from the geometric corrections for the three locations.
35. The apparatus of one of 24-33, wherein the correction data comprises an ionospheric delay per satellite at multiple regional network stations, and wherein the at least one processor is operative to interpolate an ionospheric delay for the rough position.
36. The apparatus of one of 24-35, wherein the correction data comprises an ionospheric delay per satellite at multiple regional network stations and an ionospheric phase bias per satellite, and wherein the at least one processor is operative to, for each satellite, interpolate an absolute ionospheric delay for the rough position and combine with the ionospheric phase bias.
37. The apparatus of one of 24-36, wherein the data set comprises a tropospheric delay per satellite at multiple regional network stations, and wherein the at least one processor is operative to interpolate a tropospheric delay for the rough position.
38. The apparatus of one of 24-37, wherein the at least one processor is operative to combine the rover corrections with the rover observations to obtain corrected rover observations, and to determine the precise rover position from the corrected rover observations.
39. The apparatus of one of 24-38, wherein the at least one processor is operative to use the rover corrections to estimate simulated reference station observables for each of multiple satellites in view at a selected location, and to differentially process the rover observations with the simulated reference station observables to obtain the precise rover position.
40. The apparatus of 39, wherein the at least one processor is operative to use the rover corrections to estimate at least one simulated reference station carrier-phase observation for each of multiple satellites observable at a selected location.
41. The apparatus of one of 39-40, wherein the at least one processor is operative to use the rover collections to estimate at least one simulated reference station code observation for each of multiple satellites observable at the selected location.
42. The apparatus of one of 39-41, wherein the selected location is one of (i) the rough position of the rover and (ii) a location within 100 m of the rough position of the rover.
43. The apparatus of one of 39-42, wherein the at least one processor is remote from the rover.
44. The apparatus of one of 39-42, wherein the at least one processor is at the rover.

Part 8.C: Regional Correction Data

Data Stream

1. A correction data stream for use in determining a precise position of a rover located within a region from rover observations comprising code observations and carrier-phase observations of GNSS signals on at least two carrier frequencies, the correction data stream comprising at least one code bias per satellite, ionospheric delay over the region, tropospheric delay over the region, and a phase-leveled geometric correction per satellite.
2. The correction data stream of 1, wherein the correction data stream is produced by processing GNSS data, derived from observations at multiple stations, located within a region, of GNSS signals of multiple satellites over multiple epochs, wherein the GNSS signals have at least two carrier frequencies and the observations include code observations and carrier-phase observations.
3. The correction data stream of one of 1-2, wherein the correction data stream is produced by obtaining at least one code bias per satellite, obtaining an ionospheric delay over the region, obtaining a tropospheric delay over the region, and obtaining a phase-leveled geometric correction per satellite.
4. The correction data stream of one of 1-3, wherein the at least one code bias per satellite is consistent with integer carrier-phase ambiguities.
5. The correction data stream of one of 1-4, wherein the code bias comprises a MW bias which is consistent with integer carrier ambiguities
6. The correction data stream of one of 4-5, wherein ambiguities comprise at least one of: (i) widelane ambiguities and (ii) L1 and L2 ambiguities, (iii) L2E and L2C ambiguities, and (iv) a combination of carrier-phase ambiguities from which widelane ambiguities can be determined.
7. The correction data stream of one of 1-6, wherein the ionospheric delay over the region is estimated from observations of an ionospheric delay per station per satellite.
8. The correction data stream of one of 1-6, wherein the ionospheric delay over the region is obtained from a model.
9. The correction data stream of one of 1-8, further comprising an ionospheric phase bias per satellite.
10. The correction data stream of one of 1-9, wherein the tropospheric delay over the region is estimated from the observations of a tropospheric delay per station.
11. The correction data stream of 10, wherein the tropospheric delay per station comprises a zenith total delay per station.

12. The correction data stream of one of 1-11, wherein the phase-leveled geometric correction per satellite is estimated so as to preserve integer nature of carrier-phase ambiguities.
13. The correction data stream of one of 1-12, wherein the phase-leveled geometric correction includes an integer-cycle bias per satellite.
14. The correction data stream of one of 1-13, comprising at least one of (i) an ionospheric delay per station per satellite, and (ii) a tropospheric delay per station.
15. The correction data stream of one of 1-14, wherein the phase-leveled geometric correction per satellite comprises a geometric correction term for each of three locations within the region from which a geometric correction at an arbitrary location within the region can be determined.

Part 8.D: Regional Correction Data Format

Encoding—Methods

1. A method of preparing a GNSS correction message, comprising:
   a. receiving correction data derived from observations at multiple stations, located within a region, of GNSS signals of multiple satellites over multiple epochs,
   b. separating the regional correction data into network elements relating to substantially all of the stations and cluster elements relating to subsets of the stations,
   c. constructing a correction message comprising at least one network message containing network elements and at least one cluster message containing cluster elements.
2. The method of 1, wherein the correction message comprises a plurality of correction-message epochs, each correction-message epoch comprising a network message and at least one cluster message.
3. The method of one of 1-2, wherein the correction message of a first correction-message epoch comprises cluster messages of a first group of clusters, and the correction message of a second correction message epoch comprises cluster messages of a second group of clusters.
4. The method of one of 1-3, wherein at least one cluster message for each subset of the stations is included in a series of correction-message epochs.
5. The method of one of 1-4, wherein the network elements comprise at least one of a geometric correction per satellite and a code bias per satellite.
6. The method of 5, wherein the network elements comprise at least one of a time tag, a location of a point in the network, and a number of following cluster messages.
7. The method of one of 1-6, wherein the cluster elements comprise at least one of a tropospheric scaling per station, an ionospheric correction per station per satellite, and a location per station.
8. The method of one of 1-7, wherein the correction data comprises at least one code bias per satellite, at leas; one of a fixed-nature MW bias per satellite and values from which a fixed-nature MW bias per satellite is derivable, and at least one of: an ionospheric delay per satellite for each of multiple regional network stations, and non-ionospheric corrections.
9. The method of one of 1-8, wherein the correction data comprises an ionospheric delay per satellite for each of multiple regional network stations and an ionospheric phase bias per satellite.
10. The method of one of 1-8, wherein the network elements comprise an ionospheric phase bias per satellite and the cluster elements comprise art ionospheric delay per satellite for each of multiple regional network stations.

Encoding—Computer Program Product

11. A computer program product comprising: a computer usable medium having computer readable instructions physically embodied therein, the computer readable instructions when executed by a processor enabling the processor to perform the method of one of 1-10.
2. A computer program comprising a set of instructions which when loaded in and executed by a processor enable the processor to perform the method of one of 1-10.

Encoding—Apparatus

13. Apparatus comprising a processor with instructions enabling the processor to prepare a GNSS correction message for correction derived from observations at multiple stations, located within a region, of GNSS signals of multiple satellites over multiple epochs by separating the regional correction data into network elements relating to substantially all of the stations and cluster elements relating to subsets of the stations, and constructing a correction message comprising at least one network message containing network elements and at least one cluster message containing cluster elements.
14. The apparatus of 13, wherein the correction, message comprises a plurality of correction-message epochs, each correction-message epoch comprising a network message and at least one cluster message.
15. The apparatus of one of 13-14, wherein the collection message of a first correction-message epoch comprises cluster messages of a first group of clusters, and the correction message of a second correction message epoch comprises cluster messages of a second group of clusters.
16. The apparatus of one of 13-15, wherein at least one cluster message for each subset of the stations is included in a series of correction-message epochs.
17. The apparatus of one of 13-16, wherein the network elements comprise at least one of a geometric correction per satellite and a code bias per satellite.
18. The apparatus of 17, wherein the network elements comprise at least one of a time tag, a location of a point in the network, and a number of following cluster messages.
19. The apparatus of one of 13-15, wherein the cluster elements comprise at least one of a tropospheric scaling per station, an ionospheric correction per station per satellite, and a location per station.
20. The apparatus of one of 13-19, wherein the correction data comprises at least one code bias per satellite, at least one of a fixed-nature MW bias per satellite and values from which a fixed-nature MW bias per satellite is derivable, and at least one of: an ionospheric delay per satellite for each of multiple regional network stations, and non-Ionospheric corrections.
21. The apparatus of one of 13-20, wherein the correction data comprises an ionospheric delay per satellite for each of multiple regional network stations and an ionospheric phase bias per satellite.

39

22. The apparatus of one of 13-20, wherein the network elements comprise an ionospheric phase bias per satellite and the cluster elements comprise an ionospheric delay per satellite for each of multiple regional network stations.

Decoding—Methods

1. A method of preparing regional GNSS corrections from a correction message having at least one network message containing network demerits relating to substantially all stations of a network of stations located within a region, and having at least one cluster message with each cluster message containing duster elements relating to a respective subset of the stations, comprising: extracting network, elements from the at least one network message, extracting cluster elements from the at least one cluster message, and preparing from the network elements and the cluster elements correction data suitable for use with rover observations to determine a precise position of a rover within the region.
2. The method of 1, wherein the correction message comprises a plurality of correction-message epochs, each correction-message epoch comprising a network message and at least one cluster message.
3. The method of one of 1-2, wherein the correction message of a first correction-message epoch comprises cluster messages of a first group of clusters, and the correction message of a second correction message epoch comprises cluster messages of a second group of clusters.
4. The method of one of 1-3, wherein at least one cluster message for each subset of the stations is included in a series of correction-message epochs.
5. The method of one of 1-4, wherein the network elements comprise at least one of a geometric correction per satellite and a code bias per satellite.
6. The method of 5, wherein the network elements comprise at least one of a time tag, a location of a point in the network, and a number of following cluster messages.
7. The method of one of 1-6, wherein the cluster demerits comprise at least one of a tropospheric scaling per station, an ionospheric correction per station per satellite, and a location per station.
8. The method of one of 1-7, wherein the correction data comprises at least one code bias per satellite, at least one of a fixed-nature MW bias per satellite and valises from which a fixed-nature MW bias per satellite is derivable, and at least one of: an ionospheric delay per satellite for each of multiple regional network stations, and non-ionospheric corrections.
9. The method of one of 1-8, wherein the correction data comprises an ionospheric delay per satellite for each of multiple regional network stations and an ionospheric phase bias per satellite.
10. The method of one of 1-8, wherein, the network elements comprise an ionospheric phase bias per satellite and the cluster elements comprise an ionospheric delay per satellite for each of multiple regional network stations.

Decoding—Computer Program Product

11. A computer program product comprising: a computer usable medium having computer readable instructions physically embodied therein, the computer readable instructions when executed by a processor enabling the processor to perform the method of one of 1-10.
12. A computer program comprising a set of instructions which when loaded in and executed by a processor enable the processor to perform the method of one of 1-10.

Decoding—Apparatus

13. Apparatus comprising a processor with instructions enabling the processor to prepare regional GNSS corrections from a correction message having at least one network message containing network elements relating to substantially all stations of a network of stations located within a region, and having at least one cluster message with each cluster message containing cluster elements relating to a respective subset of the stations, by extracting network elements from the at least one network message, extracting cluster elements from the at least one cluster message, and preparing from the network elements and the cluster elements correction data suitable for use with rover observations to determine a precise position of a rover within the region.
14. The apparatus of 13, wherein the correction message comprises a plurality of correction-message epochs, each correction-message epoch comprising a network message and at least one cluster message.
15. The apparatus of one of 13-14, wherein the correction message of a first correction-message epoch comprises cluster messages of a first group of clusters, and the correction message of a second correction message epoch comprises cluster messages of a second group of clusters.
16. The apparatus of one of 13-15, wherein at least one cluster message for each subset of the stations is included in a series of correction-message epochs.
17. The apparatus of one of 13-16, wherein the network elements comprise at least one of a geometric correction per satellite and a code bias per satellite,
18. The apparatus of 17, wherein the network elements comprise at least one of a time tag, a location of a point in the network, and a number of following cluster messages.
19. The apparatus of one of 13-18, wherein the cluster elements comprise at least one of a tropospheric scaling per station, an ionospheric correction per station per satellite, and a location per station.
20. The apparatus of one of 13-19, wherein the correction data comprises at least one code bias per satellite, at least one of a fixed-nature MW bias per satellite and values from which a fixed-nature MW bias per satellite is derivable, and at least one of: an ionospheric delay per satellite for each of multiple regional network stations, and non-ionospheric corrections.
21. The apparatus of one of 13-20, wherein the correction data comprises art ionospheric delay per satellite for each of multiple regional network stations and an ionospheric phase bias per satellite.
22. The apparatus of one of 13-20, wherein the network elements comprise an ionospheric phase bias per satellite and the cluster elements comprise an ionospheric delay per satellite for each of multiple regional network stations.

The invention claimed is:
1. A method of operating one or more processors each having associated data storage and program code to determine rover correction data, the method comprising:

operating the one or more processors to process global navigation satellite system (GNSS) data derived from observations at multiple stations, located within a local region, of GNSS signals of multiple satellites over multiple epochs, wherein the GNSS signals have at least two carrier frequencies and the observations include code observations and carrier-phase observations, wherein the one or more processors use the observations to:

operating the one or more processors to obtain at least one code bias for each of the multiple satellites;

obtain an ionospheric delay over the local region;

obtain a tropospheric delay over the local region; and obtain a phase-leveled geometric correction for each of the multiple satellites, wherein the phase-leveled geometric correction is based at least on geometric range, satellite clock error, and carrier-phase ambiguities;

transmitting correction data to a rover located within the local region, the correction data comprising: the ionospheric delay over the local region, the tropospheric delay over the local region, the phase-leveled geometric correction for each of the multiple satellites, and the at least one code bias for each of the multiple satellites.

2. The method of claim 1, wherein obtaining at least one code bias for each of the multiple satellites comprises obtaining an estimated code bias for each of the multiple satellites from a global network processor.

3. The method of claim 1, wherein obtaining at least one code bias for each of the multiple satellites comprises operating a processor to estimate a code bias for each of the multiple satellites from GNSS observations of the multiple stations.

4. The method of claim 3, wherein obtaining the code bias comprises operating a processor to fix a set of ambiguities and to estimate at least one code bias for each of the multiple satellites which is consistent with integer carrier-phase ambiguities.

5. The method of claim 4, wherein the code bias comprises a Melbourne-Wübenna (MW) bias that is consistent with integer carrier ambiguities.

6. The method of claim 4, wherein the set of ambiguities comprises at least one of: (i) widelane ambiguities, (ii) L1 and L2 ambiguities, (iii) L2E and L2C ambiguities, and (iv) a combination of carrier-phase ambiguities from which widelane ambiguities can be determined.

7. The method of claim 1, wherein obtaining an ionospheric delay over the region comprises operating a processor to determine the ionospheric delay over the local region from a model.

8. The method of claim 1, wherein obtaining an ionospheric delay over the local region comprises operating a processor to estimate from the observations an ionospheric delay per station for each of the multiple satellites.

9. The method of claim 1, wherein obtaining an ionospheric delay over the local region comprises operating a processor to estimate from the observations an ionospheric delay per station for each of the multiple satellites and an ionospheric phase bias for each of the multiple satellites.

10. The method of claim 1, wherein obtaining a tropospheric delay over the local region comprises operating a processor to estimate from the observations a tropospheric delay per station.

11. The method of claim 10, wherein the tropospheric delay per station comprises a zenith total delay per station.

12. The method of claim 1, wherein obtaining a phase-leveled geometric correction for each of the multiple satellites comprises operating a processor to estimate a geometric correction which preserves integer nature of carrier-phase ambiguities.

13. The method of claim 1, wherein the phase-leveled geometric correction includes an integer-cycle bias per satellite.

14. The method of claim 1, wherein the correction data comprises at least one of (i) an ionospheric delay per station for each of the multiple satellites, (ii) an ionospheric delay per station for each of the multiple satellites and an ionospheric phase bias for each of the multiple satellites, and (iii) a tropospheric delay per station.

15. The method of claim 1, wherein the phase-leveled geometric correction for each of the multiple satellites comprises a geometric correction term for each of three locations within the local region from which a geometric correction at an arbitrary location within the local region can be determined.

16. A computer program product comprising: a non-transitory computer usable medium having computer readable instructions physically embodied therein, the computer readable instructions when executed by a processor enabling the one or more processors to perform the method of claim 1.

17. Apparatus for determining rover correction data, comprising:

at least one processor operative to process global navigation satellite system (GNSS) data derived from observations at multiple stations, located within a local region, of GNSS signals of multiple satellites over multiple epochs, wherein the GNSS signals have at least two carrier frequencies and the observations include code observations and carrier-phase observations, wherein the at least one processor is also operative to use the observations to obtain: at least one code bias for each of the multiple satellites, an ionospheric delay over the local region, a tropospheric delay over the local region, and a phase-leveled geometric correction for each of the multiple satellites, wherein obtaining the phase-leveled geometric correction comprises operating the at least one processor to estimate a set of carrier-phase ambiguities for the multiple satellites and using at least some of the set of carrier-phase ambiguities to estimate the phase-leveled geometric correction for each of the multiple satellites; and a transmitter operative to transmit correction data to a rover located within the local region, the correction data comprising: the ionospheric delay over the local region, the tropospheric delay over the local region, the phase-leveled geometric correction for each of the multiple satellites, and the at least one code bias for each of the multiple satellites.

18. The apparatus of claim 17, wherein the at least one processor obtains the at least one code bias for each of the multiple satellites from a global network processor.

19. The apparatus of claim 17, wherein the at least one processor is operative to estimate a code bias for each of the multiple satellites from GNSS observations of the multiple stations.

20. The apparatus of claim 19, wherein the at least one processor is operative to fix the set of carrier-phase ambiguities and to estimate the at least one code bias for each of the multiple satellites which is consistent with integer carrier-phase ambiguities.

21. The apparatus of claim 20, wherein the code bias comprises a Melbourne-Wübenna (MW) bias that is consistent with integer carrier ambiguities.

22. The apparatus of claim 20, wherein the set of carrier-phase ambiguities comprises at least one of: (i) widelane ambiguities, (ii) L1 and L2 carrier-phase ambiguities, (iii) L2E and L2C carrier-phase ambiguities, and (iv) a combination of carrier-phase ambiguities from which widelane ambiguities can be determined.

23. The apparatus of claim 17, wherein the at least one processor is operative to determine the ionospheric delay over the local region from a model.

24. The apparatus of claim 17, wherein the at least one processor is operative to estimate from the observations an ionospheric delay per station for each of the multiple satellites.

25. The apparatus of claim 17, wherein the at least one processor is operative to estimate from the observations an ionospheric delay per station for each of the multiple satellites and an ionospheric phase bias for each of the multiple satellites.

26. The apparatus of claim 17, wherein the at least one processor is operative to estimate from the observations a tropospheric delay per station.

27. The apparatus of claim 26, wherein the tropospheric delay per station comprises a zenith total delay per station.

28. The apparatus of claim 17, wherein the at least one processor is operative to estimate a geometric correction that preserves integer nature of carrier-phase ambiguities.

29. The apparatus of claim 17, wherein the phase-leveled geometric correction includes an integer-cycle bias for each of the multiple satellites.

30. The apparatus of claim 17, wherein the correction data comprises at least one of (i) an ionospheric delay per station for each of the multiple satellites, and (ii) a tropospheric delay per station.

31. The apparatus of claim 17, wherein the phase-leveled geometric correction for each of the multiple satellites comprises a geometric correction term for each of three locations within the local region from which a geometric correction at an arbitrary location within the local region can be determined.

32. A method of operating one or more processors each having associated data storage and program code to determine rover correction data, the method comprising:

operating the one or more processors to process global navigation satellite system (GNSS) data derived from observations at multiple stations, located within a local region, of GNSS signals of multiple satellites over multiple epochs, wherein the GNSS signals have at least two carrier frequencies and the observations include code observations and carrier-phase observations, wherein the one or more processors use the observations to determine correction data that includes:

at least one code bias for each of the multiple satellites;

an ionospheric delay over the local region;

a tropospheric delay over the local region; and a phase-leveled geometric correction for each of the multiple satellites, wherein the phase-leveled geometric correction is based at least on geometric range, satellite clock error, and carrier-phase ambiguities without considering ionospheric delay;

transmitting at least a portion of the correction data to a rover located within the local region.

* * * * *